(12) United States Patent
Decoux et al.

(10) Patent No.: US 11,854,019 B2
(45) Date of Patent: Dec. 26, 2023

(54) ARTICLE ANTI-FORGERY PROTECTION

(71) Applicant: SICPA HOLDING SA, Prilly (CH)

(72) Inventors: Eric Decoux, Vevey (CH); Philippe Gillet, Pully (CH); Philippe Thevoz, Penthalaz (CH); Elisabeth Wallace, Pully (CH)

(73) Assignee: SICPA HOLDING SA, Prilly (CH)

(*) Notice: Subject to any disclaimer, the term of this patent is extended or adjusted under 35 U.S.C. 154(b) by 453 days.

(21) Appl. No.: 17/259,393

(22) PCT Filed: Jun. 3, 2019

(86) PCT No.: PCT/EP2019/064359
§ 371 (c)(1),
(2) Date: Jan. 11, 2021

(87) PCT Pub. No.: WO2020/011447
PCT Pub. Date: Jan. 16, 2020

(65) Prior Publication Data
US 2021/0287230 A1 Sep. 16, 2021

(30) Foreign Application Priority Data
Jul. 10, 2018 (EP) ..................................... 18182697

(51) Int. Cl.
*G06Q 30/018* (2023.01)
*B42D 25/405* (2014.01)
(Continued)

(52) U.S. Cl.
CPC ......... *G06Q 30/0185* (2013.01); *B42D 25/21* (2014.10); *B42D 25/405* (2014.10);
(Continued)

(58) Field of Classification Search
None
See application file for complete search history.

(56) References Cited

U.S. PATENT DOCUMENTS 4,309,569 A 1/1982 Merkle
10,608,824 B1* 3/2020 Praus ..................... H04L 9/083
(Continued)

FOREIGN PATENT DOCUMENTS

CN 1688992 10/2005
CN 1706169 12/2005
(Continued)

OTHER PUBLICATIONS

Barak, Boaz, "Lecture 16—Digital Signatures" [online], published on Nov. 15, 2005, available at: < https://www.cs.princeton.edu/courses/archive/fall05/cos433/lec16.pdf > (Year: 2005).*
(Continued)

*Primary Examiner* — Richard W. Crandall
(74) *Attorney, Agent, or Firm* — Muncy, Geissler, Olds & Lowe, P.C.

(57) ABSTRACT

The invention relates to securing of an article against forgery and falsifying of its associated data, and particularly of data relating to its belonging to a specific batch of articles, while allowing offline or online checking of the authenticity of a secured article and conformity of its associated data with respect to that of a genuine article.

26 Claims, 5 Drawing Sheets

(51) Int. Cl.
*H04L 9/32* (2006.01)
*B42D 25/21* (2014.01)
*B42D 25/48* (2014.01)
*G06K 19/06* (2006.01)
*B42D 25/24* (2014.01)
*B42D 25/28* (2014.01)

(52) U.S. Cl.
CPC ....... *B42D 25/48* (2014.10); *G06K 19/06037* (2013.01); *H04L 9/3247* (2013.01); *B42D 25/24* (2014.10); *B42D 25/28* (2014.10)

(56) References Cited

U.S. PATENT DOCUMENTS

| | | |
|---|---|---|
| 2002/0184504 A1 | 12/2002 | Hughes |
| 2006/0047952 A1 | 3/2006 | Van Den Heuvel et al. |
| 2008/0002243 A1 | 1/2008 | Cowburn |
| 2009/0006255 A1 | 1/2009 | Bychkov et al. |
| 2011/0107100 A1* | 5/2011 | Loken ................. H04L 9/3236 713/170 |
| 2015/0052615 A1 | 2/2015 | Gault et al. |
| 2015/0134966 A1 | 5/2015 | Wallrabenstein |
| 2018/0189312 A1 | 7/2018 | Alas et al. |

FOREIGN PATENT DOCUMENTS

| | | | |
|---|---|---|---|
| CN | 1969284 | 5/2007 | |
| CN | 101356538 | 1/2009 | |
| CN | 104021482 | 9/2014 | |
| CN | 104166871 | 11/2014 | |
| CN | 105354604 | 2/2016 | |
| CN | 105723651 | 6/2016 | |
| EP | 2131310 A2 | 12/2009 | |
| EP | 3340212 A1 | 6/2018 | |
| EP | 3340213 A1 | 6/2018 | |
| WO | WO-2007093925 A1 * | 8/2007 | ............ G06F 21/10 |

OTHER PUBLICATIONS

S. Goldwasser and M. Bellare: "Lecture Notes on Cryptography", MIT, Jul. 2008, 289 pages.
International Search Report and Written Opinion of the ISA issued with respect to application No. PCT/EP2019/064359.
First Office Action and Search Report issued in corresponding Chinese Application No. 201980046547.6 dated Jan. 20, 2022 (and English language translation of the Office Action).
Notification of Japanese Office Action in counterpart Japan Patent Application No. 2021-500189 dated Jun. 6, 2023 (and English language translation of Office Action).

* cited by examiner

ARTICLE ANTI-FORGERY PROTECTION

TECHNICAL FIELD

The present invention relates to the technical field of protection of articles and data marked on such articles against forgery or tampering, as well as of conformity of digital images of such marked articles with the original ones, and traceability of articles.

BACKGROUND ART

From mechanical parts, electronic components, pharmaceutics, and countless other articles, the problems of counterfeiting and tampering are well known, serious, and growing. Moreover, tampering of data associated with an article is also a serious concern. The example of falsifying data marked on an original printed document such as an identity document or a diploma (article) is well known, and the concern is even worse if considering a digital copy or a photocopy of the original (possibly genuine) document. Simply keeping track of identifiers such as serial numbers is in general an insufficient response, because counterfeiters can easily copy such numbers as well.

There are many other security schemes for articles of manufacture but they typically do not provide a sufficient level of security, they have too high an administrative overhead in terms of information that must be stored and accessed, they are often impractical for use except in well-controlled environments, or they simply cannot be implemented physically. For example, many schemes for digitally securing documents in a verifiable manner are not suitable for use in contexts that involve many physical items on which it is impractical or otherwise undesirable to mark them with corresponding signatures.

One other drawback of most conventional methods for insuring the authenticity of articles, or securing their associated data, is that they tend to view articles in isolation, even if they are members of a well-defined group such as a production batch for example. This ignores valuable authenticating information.

A conventional way of securing an article is to apply on it a material-based security marking (possibly tamperproof), i.e. a marking having detectable intrinsic physical or chemical property that is very hard (if not impossible) to reproduce. If an appropriate sensor detects this intrinsic property on a marking, this marking is then considered as genuine with a high degree of confidence, and thus also the corresponding marked article. There are many examples of such known authenticating intrinsic properties: the marking can include some particles, possibly randomly dispersed, or has a specific layered structure, having intrinsic optical reflection or transmission or absorption or even emission (luminescence, for example, or polarization or diffraction or interference . . . ) properties, possibly detectable upon specific illumination conditions with "light" of specific spectral content. This intrinsic property can result from the specific chemical composition of the material of the marking: for example, luminescent pigments (possibly not commercially available) can be dispersed in an ink used for printing some pattern on the article and are used to emit specific light (for example, in a spectral window within the infrared range) upon illumination with a specific light (for example, with light in the UV spectral range). This is used for securing banknotes, for example. Other intrinsic properties can be used: for example, the luminescent particles in the marking can have a specific luminescence emission decay time after illumination with an appropriate excitation light pulse. Other types of intrinsic properties are the magnetic property of included particles, or even a "fingerprint" property of the article itself such as, for example, the relative positioning of inherently randomly dispersed fibers of a paper substrate of a document, in a given zone on the document, which, when observed at sufficient resolution, can serve to extract a unique characterizing signature, or some random printing artefacts of data printed on the article which, viewed with sufficient magnification, can also lead to a unique signature etc. . . . . . The main problem with an inherent fingerprint property of an article is its robustness with respect to aging or wear. However, a material-based security marking does not always allow also securing data associated with the marked article: for example, even if a document is marked with a material-based security marking like a logo printed with a security ink in some zone of the document, data printed on the remaining part of the document can still be falsified. Moreover, too complex authenticating signatures often necessitate significant storage capabilities involving external databases, and communication links for querying such databases, so that offline authentication of an article is not possible.

It is therefore an object of the invention to secure an article against forgery and falsifying of its associated data, and particularly of data relating to its belonging to a specific batch of articles. It is also an object of the invention to allow offline checking of the authenticity of an object secured according to the invention and conformity of its associated data with respect to that of a genuine secured object.

SUMMARY OF THE INVENTION

According to one aspect the invention relates to a method of securing a given original article belonging to a batch of a plurality of original articles against forgery or tampering, each original article having its own associated article data and corresponding article digital data, comprising the steps of:

for each original article of the batch, calculating by means of a one-way function an associated article digital signature of its corresponding article digital data;

forming a tree based on the plurality of calculated article digital signatures for the original articles of the batch and comprising nodes arranged according to a given nodes ordering in the tree, said tree comprising node levels from the leaf nodes, corresponding to the plurality of article digital signatures respectively associated to the plurality of original articles in the batch, to the root node of the tree, every non-leaf node of the tree corresponding to a digital signature by means of the one-way function of a concatenation of the respective digital signatures of its child nodes according to a tree concatenation ordering, the root node corresponding to a reference root digital signature, i.e. a digital signature by means of the one-way function of a concatenation of the digital signatures of the nodes of a penultimate nodes level in the tree according to said tree concatenation ordering;

associating with the given original article a corresponding verification key being a sequence of the respective digital signatures, from the leaf nodes level to the penultimate nodes level, of every other leaf node having the same parent node in the tree that the leaf-node corresponding to the article digital signature of the given original article, and successively at each next level in the tree, of every non-leaf node having the same parent node in the tree that the previous same parent node considered at the preceding level;

making available to a user the reference root digital signature of the tree; and applying on the given original article a machine readable security marking including a representation of its corresponding article digital data and its corresponding verification key, thereby obtaining a marked original article of which article data is secured against forgery or tampering.

The reference root digital signature of the root node of the tree may either be published in a media accessible to the user, or stored in a searchable root database accessible to the user, or stored in a blockchain, or in a database secured by a blockchain, accessible to the user.

Thus, according to the invention, the entanglement of the article digital signatures of all the articles of a batch, due to the tree structure and use of robust one-way functions for calculating the node values, together with the root digital signature of the tree made immutable and the inclusion of the article digital data and its associated verification key in a security marking applied on the corresponding article, allow tracking and tracing the marked articles with a very high level of reliability while preventing falsification of data and forgery of the marked articles.

The marked original article may further comprise root node access data marked thereto and containing information sufficient to allow the user to access to the reference root digital signature of the root node of the tree corresponding to the batch of original articles, said information being a link to an access interface operable to receive from the user a root request containing article digital data, or a digital signature of article digital data, obtained from a security marking of a marked original article, and send back a reference root digital signature of corresponding tree, the access interface allowing access to, respectively, one of the following:

the media wherein the reference root digital signature is published;

the searchable root database wherein the reference root digital signature is stored; and the blockchain, or respectively the database secured by a blockchain, wherein the time-stamped reference root digital signature is stored.

According to the invention, it is also possible that:

a virtual article is counted as belonging to the batch of original articles, said virtual article having associated virtual article data and its corresponding virtual article digital data, and an associated virtual article digital signature obtained by means of the one-way function of the virtual article digital data, said virtual article being not produced but only used for generating the associated virtual article digital signature; and the reference root digital signature associated with said batch of original articles being calculated from a tree having all the article digital signatures of the original articles of the batch, including the virtual article digital signature, as leaf nodes.

In order to have shorter signatures the one-way function may be a hash function and an article digital signature of an original article may be a sequence of a given plurality of bits of lower weights selected from the bits of a hash value of the corresponding article digital data.

In the above method, additional article digital data corresponding to the article data associated with the marked original article may be stored in a searchable information database accessible to the user via an information database interface operable to receive from the user an information request containing article digital data, or a digital signature of article digital data, obtained from a security marking of a marked original article, and send back corresponding additional article digital data. The additional article digital data corresponding to the article digital data associated with the marked original article may further be concatenated with said article digital data, whereby also the additional article digital data are secured against forgery or tampering.

Moreover, the marked original article may further comprise a corresponding article data marking applied thereto, said article data marking including the corresponding article data associated with said marked original article.

The above mentioned article digital data of the marked original article may include corresponding reference characteristic digital data of a unique physical characteristic of the marked original article, or of an associated object or individual. Moreover, the unique physical characteristic of the marked original article may be that of a material-based security marking applied on the original article, or on the associated object.

In the above method, the sequence of digital signatures of the verification key included in the article security marking may be arranged according to a sequence ordering of the nodes which is distinct from the ordering of corresponding nodes defined by the tree concatenation ordering, and the article security marking may further include an ordering code associated with said sequence ordering.

According to the invention, in case the article digital data of the respective original articles of the batch are spread between given fields common to all the articles of the batch, digital data relating to these fields may not be included in the article digital data but may be clustered in a separate fields data block associated with the batch, and wherein:

i) the article digital signature of an original article is calculated with the one-way function of a concatenation of the corresponding article digital data and the digital data of the fields data block; and ii) the reference root digital signature is made available to the user together with the associated fields data block.

Another aspect of the invention relates to a method of verifying the authenticity of an article, or the conformity of a copy of such article, with respect to a marked original article belonging to a batch of original articles secured according to the above securing method, comprising the steps of, upon viewing a test object being said article or said copy of the article:

acquiring a digital image of a security marking on the test object by means of an imager having an imaging unit, a processing unit with a memory, and an image processing unit;

reading a representation of article digital data and an associated verification key on the acquired digital image of the security marking on the test object, and extracting respectively corresponding test article digital data and test verification key from said read representation;

having stored in the memory a reference root digital signature of a root node of a tree of the batch of original articles, and having programmed in the processing unit the one-way function to calculate a digital signature of digital data and of a concatenation of digital signatures according to the nodes ordering in the tree and the tree concatenation ordering;

verifying whether the extracted test article digital data and associated test verification key indeed correspond to the stored reference root digital signature by performing the steps of:

calculating with the one-way function a test digital signature of the extracted test article digital data, said test digital signature corresponding to a test leaf node in a test tree corresponding to the security marking on the test object;

extracting from the sequence of digital signatures in the test verification key, a digital signature of every other leaf node of the test tree having the same parent node than that of the test leaf node and calculating a digital signature of a concatenation of the test digital signature and the extracted digital signature of said every other leaf node, thus obtaining a digital signature of said same parent node of the test leaf node;

successively at each next level in the test tree and up to the penultimate nodes level, extracting from the sequence of digital signatures in the test verification key, a digital signature of every other non-leaf node of the test tree having the same parent node than that of the previous same parent node considered at the preceding step and calculating a digital signature of a concatenation of the digital signature of said respective every other non-leaf node and the obtained digital signature of said previous same parent node, thus obtaining a digital signature of said same parent node of said previous same parent node;

calculating a digital signature of a concatenation of the obtained digital signatures of the non-leaf nodes corresponding to the penultimate nodes level of the test tree, thus obtaining a candidate root digital signature of the root node of the test tree; and checking whether the obtained candidate root digital signature matches the stored reference root digital signature, whereby, in case said root digital signatures match, the article data on the test object are that of a genuine article.

If the marked original article is secured while having the above mentioned separate fields data block, the memory of the processing unit may further store said associated fields data block, and the step of calculating a test digital signature corresponding to a test leaf node in a test tree corresponding to the security marking on the test object may comprise calculating with the one-way function a digital signature of a concatenation of the extracted test article digital data and the digital data of the stored fields data block.

If the article has been secured by storing the reference root digital signature in a searchable root database accessible to the user, the imager being further equipped with a communication unit operable to send and receive back data via a communication link, the above verifying method may comprise the preliminary steps of:

sending with the communication unit via the communication link a request to said root database, and receiving back the reference root digital signature; and storing the received root digital signature in the memory of the imager.

In case the secured article comprises root node access data as explained above, and the imager is further equipped with a communication unit operable to send and receive data via a communication link, the above verifying method may comprise the preliminary steps of:

reading the root node access data marked on the test object with the imager;

sending with the communication unit via the communication link a root request to said access interface containing the article digital data, or a digital signature of said article digital data, obtained from the security marking on the test object, and receiving back a corresponding reference root digital signature of associated batch; and storing the received reference root digital signature in the memory of the imager.

The secured article may comprise additional article digital data as explained above, and the imager may further be equipped with communication means operable to send to the information database interface an information request containing article digital data, or corresponding article digital signature data, obtained from the security marking on the test object, and receive back corresponding additional article digital data.

If the secured article includes an article data marking as explained above, the method may comprise the further steps of:

reading article data marked on an article data marking on the test object with the imager; and checking that the article data read from the article data marking correspond with the article digital data extracted from the security marking on the test object.

Moreover, if the secured article includes reference characteristic digital data as explained above, and the imager is further equipped with a sensor operable to detect a unique physical characteristic of respectively a marked original article, or of an associated object or individual, and the processing unit is programmed to extract corresponding characteristic digital data from a detection signal received from the sensor, the imager having stored in the memory reference characteristic digital data CDD corresponding to said unique physical characteristic of respectively the marked original article, or of the associated object or individual, the above method my comprise the further steps of, upon viewing a subject being said article or said associated object or individual:

detecting with the sensor a unique physical characteristic of the subject and extracting corresponding candidate characteristic digital data $CDD^c$;

comparing the obtained candidate characteristic digital data $CDD^c$ with the stored reference characteristic digital data CDD; and in case the candidate characteristic digital data $CDD^c$ is similar to the stored reference characteristic digital data CDD, within a given tolerance criterion, the subject is considered as corresponding respectively to a genuine article, or an object or individual validly associated with a genuine article.

A further aspect of the invention relates to a method of verifying the conformity of an article digital image of an article with respect to a marked original article belonging to a batch of original articles secured according to the above mentioned securing method, comprising the steps of:

obtaining the article digital image showing a security marking on the article by means of an imager having an imaging unit, a processing unit with a memory, and an image processing unit;

reading a representation of article digital data and of an associated verification key on the obtained digital image of the security marking, and extracting respectively corresponding test article digital data and associated test verification key from said read representation;

having stored in the memory a reference root digital signature of a root node of a tree of the batch of original articles, and having programmed in the processing unit the one-way function to calculate a digital signature of digital data and of a concatenation of digital signatures according to the nodes ordering in the tree and the tree concatenation ordering;

verifying whether the extracted test article digital data and test verification key indeed correspond to the stored reference root digital signature by performing the steps of:

calculating with the one-way function a test digital signature of the extracted test article digital data, said test digital signature corresponding to a test leaf node in a test tree corresponding to the security marking on the test object;

extracting from the sequence of digital signatures in the test verification key, a digital signature of every other leaf node of the test tree having the same parent node than that of the test leaf node and calculating a digital signature of a concatenation of the test digital signature and the extracted digital signature of said every other leaf node, thus obtaining a digital signature of said same parent node of the test leaf node;

successively at each next level in the test tree and up to the penultimate nodes level, extracting from the sequence of digital signatures in the test verification key, a digital signature of every other non-leaf node of the test tree having the same parent node than that of the previous same parent node considered at the preceding step and calculating a digital signature of a concatenation of the digital signature of said respective every other non-leaf node and the obtained digital signature of said previous same parent node, thus obtaining a digital signature of said same parent node of said previous same parent node;

calculating a digital signature of a concatenation of the obtained digital signatures of the non-leaf nodes corresponding to the penultimate nodes level of the test tree, thus obtaining a candidate root digital signature of the root node of the test tree; and checking whether the obtained candidate root digital signature matches the stored reference root digital signature, whereby, in case said root digital signatures match, the article digital image is that of a genuine marked original article.

In case the batch of secured marked original article has an associated fields data block as explained above, the memory of the processing unit further storing the associated fields data block, the step of calculating a test digital signature corresponding to a test leaf node in a test tree corresponding to the security marking on the test object may comprise calculating with the one-way function a digital signature of a concatenation of the extracted test article digital data and the digital data of the stored fields data block.

If the original article has been secured by storing the reference root digital signature in a searchable root database accessible as mentioned above, and the imager is further equipped with a communication unit operable to send and receive back data via a communication link, the method may comprise the preliminary steps of:

sending with the communication unit via the communication link a request to said root database, and receiving back the reference root digital signature; and storing the received root digital signature in the memory of the imager.

If the original article includes root node access data as mentioned above, and the imager is further equipped with a communication unit operable to send and receive data via a communication link, the method may comprise the preliminary steps of:

reading root node access data marked on the article digital image with the imager;

sending with the communication unit via the communication link a root request to the access interface containing the extracted test article digital data, or the calculated test digital signature, and receiving back a reference root digital signature of the root node of the tree of the batch of original articles; and storing the received reference root digital signature in the memory of the imager.

If the marked original article has associated additional article digital data stored in a searchable information database as mentioned above, the imager may further be equipped with communication means operable to send to the information database interface an information request containing test article digital data, or test article digital signature data, and receive back corresponding additional article digital data.

In case the secured original article includes reference characteristic digital data as mentioned above, and the imager is further equipped with a sensor operable to detect a unique physical characteristic of respectively an object or an individual associated with a marked original article, and the processing unit is programmed to extract corresponding characteristic digital data from a detection signal received from the sensor, the imager having stored in the memory reference characteristic digital data CDD corresponding to said unique physical characteristic of respectively the associated object or individual, the method may comprise the further steps of, upon viewing a subject being said associated object or individual:

detecting with the sensor a unique physical characteristic of the subject and extracting corresponding candidate characteristic digital data $CDD^c$;

comparing the obtained candidate characteristic digital data $CDD^c$ with the stored reference characteristic digital data CDD; and in case the candidate characteristic digital data $CDD^c$ is similar to the stored reference characteristic digital data CDD, within a given tolerance criterion, the subject is considered as corresponding respectively to an object or individual validly associated with a genuine marked original article.

Another aspect of the invention relates to an article belonging to a batch of a plurality of original articles and secured against forgery or tampering according to the above mentioned securing method, each original article of the batch having its own article digital data and corresponding verification key, said batch having a corresponding reference root digital signature, comprising:

a machine readable security marking applied on the article and including a representation of its article digital data and its verification key.

The article digital data of the above article may include reference characteristic digital data CDD of a corresponding unique physical characteristic of the article, or of an associated object or individual. Moreover the unique physical characteristic of the article may be that of a material-based security marking applied on the article.

Another aspect of the invention relates to a system for verifying the authenticity of an article, or the conformity of a copy of such article, with respect to a marked original article belonging to a batch of original articles secured with dual material and digital protection against forgery or tampering, according to the above mentioned securing method, comprising an imager having an imaging unit, a processing unit with a memory, and an image processing unit, the memory storing a reference root digital signature of a tree corresponding to the batch of original articles, and the one-way function to calculate a digital signature of digital data and of a concatenation of digital signatures according to the nodes ordering in the tree and the tree concatenation ordering being programmed in the processing unit, said system being operable to:

acquire with the imager a digital image of a security marking on a test object being said article or said copy of the article;
  read with the imager a representation of article digital data and of an associated verification key on the acquired digital image of the security marking on the test object, and extract respectively corresponding test article digital data and test verification key from said read representation;
  verify whether the extracted test article digital data and associated verification key indeed correspond to the stored reference root digital signature by executing on the processing unit the further programmed steps of:
    calculating with the one-way function a test digital signature from the calculated digital signature of the extracted test article digital data, said test digital signature corresponding to a test leaf node in a test tree corresponding to the security marking on the test object;
    extracting from the sequence of digital signatures in the test verification key, a digital signature of every other leaf node of the test tree having the same parent node than that of the test leaf node and calculating a digital signature of a concatenation of the test digital signature and the extracted digital signature of said every other leaf node, thus obtaining a digital signature of said same parent node of the test leaf node;
    successively at each next level in the test tree and up to the penultimate nodes level, extracting from the sequence of digital signatures in the test verification key, a digital signature of every other non-leaf node of the test tree having the same parent node than that of the previous same parent node considered at the preceding step and calculating a digital signature of a concatenation of the digital signature of said respective every other non-leaf node and the obtained digital signature of said previous same parent node, thus obtaining a digital signature of said same parent node of said previous same parent node;
    calculating a digital signature of a concatenation of the obtained digital signatures of the non-leaf nodes corresponding to the penultimate nodes level of the test tree, thus obtaining a candidate root digital signature of the root node of the test tree; and
    checking whether the obtained candidate root digital signature matches the stored reference root digital signature,
  whereby, in case said root digital signatures match, the system is configured to deliver an indication that the article data on the test object are that of a genuine article.

If the marked original article has an associated fields data block as above mentioned, the memory of the processing unit further storing the associated fields data block, the step of calculating a test digital signature corresponding to a test leaf node in a test tree corresponding to the security marking on the test object then comprises calculating with the one-way function a digital signature of a concatenation of the extracted test article digital data and the digital data of the stored fields data block.

Another aspect of the invention relates to a system for verifying the conformity of an article digital image of an article with respect to a marked original article belonging to a batch of original articles secured according to the above securing method, comprising an imager having an imaging unit, a processing unit with a memory, and an image processing unit, the memory storing a reference root digital signature of a tree corresponding to the batch of original articles, and the one-way function to calculate a digital signature of digital data and of a concatenation of digital signatures according to the nodes ordering in the tree and the tree concatenation ordering being programmed in the processing unit, said system being operable to:

obtain the article digital image showing a security marking on the article by means of the imager;
  read with the imager a representation of article digital data and of an associated verification key on the obtained digital image of the security marking, and extract respectively corresponding test article digital data and associated test verification key from said read representation;
  verify whether the extracted test article digital data and test verification key indeed correspond to the stored reference root digital signature by executing on the processing unit the further programmed steps of:
    calculating with the one-way function a test digital signature of the extracted test article digital data, said test digital signature corresponding to a test leaf node in a test tree corresponding to the security marking on the test object;
    extracting from the sequence of digital signatures in the test verification key, a digital signature of every other leaf node of the test tree having the same parent node than that of the test leaf node and calculating a digital signature of a concatenation of the test digital signature and the extracted digital signature of said every other leaf node, thus obtaining a digital signature of said same parent node of the test leaf node;
    successively at each next level in the test tree and up to the penultimate nodes level, extracting from the sequence of digital signatures in the test verification key, a digital signature of every other non-leaf node of the test tree having the same parent node than that of the previous same parent node considered at the preceding step and calculating a digital signature of a concatenation of the digital signature of said respective every other non-leaf node and the obtained digital signature of said previous same parent node, thus obtaining a digital signature of said same parent node of said previous same parent node;
    calculating a digital signature of a concatenation of the obtained digital signatures of the non-leaf nodes corresponding to the penultimate nodes level of the test tree, thus obtaining a candidate root digital signature of the root node of the test tree; and
    checking whether the obtained candidate root digital signature matches the stored reference root digital signature,
  whereby, in case said root digital signatures match, the system is configured to deliver an indication that the article digital image is that of a genuine marked original article.

If the marked original article has an associated fields data block as above mentioned, the memory of the processing unit further storing the associated fields data block, the step of calculating a test digital signature corresponding to a test leaf node in a test tree corresponding to the security marking on the test object may comprise calculating with the one-way function a digital signature of a concatenation of the extracted test article digital data and the digital data of the stored fields data block.

The present invention will be described more fully hereinafter with reference to the accompanying drawings in which like numerals represent like elements throughout the different figures, and in which prominent aspects and features of the invention are illustrated.

DETAILED DESCRIPTION

Figure 1:
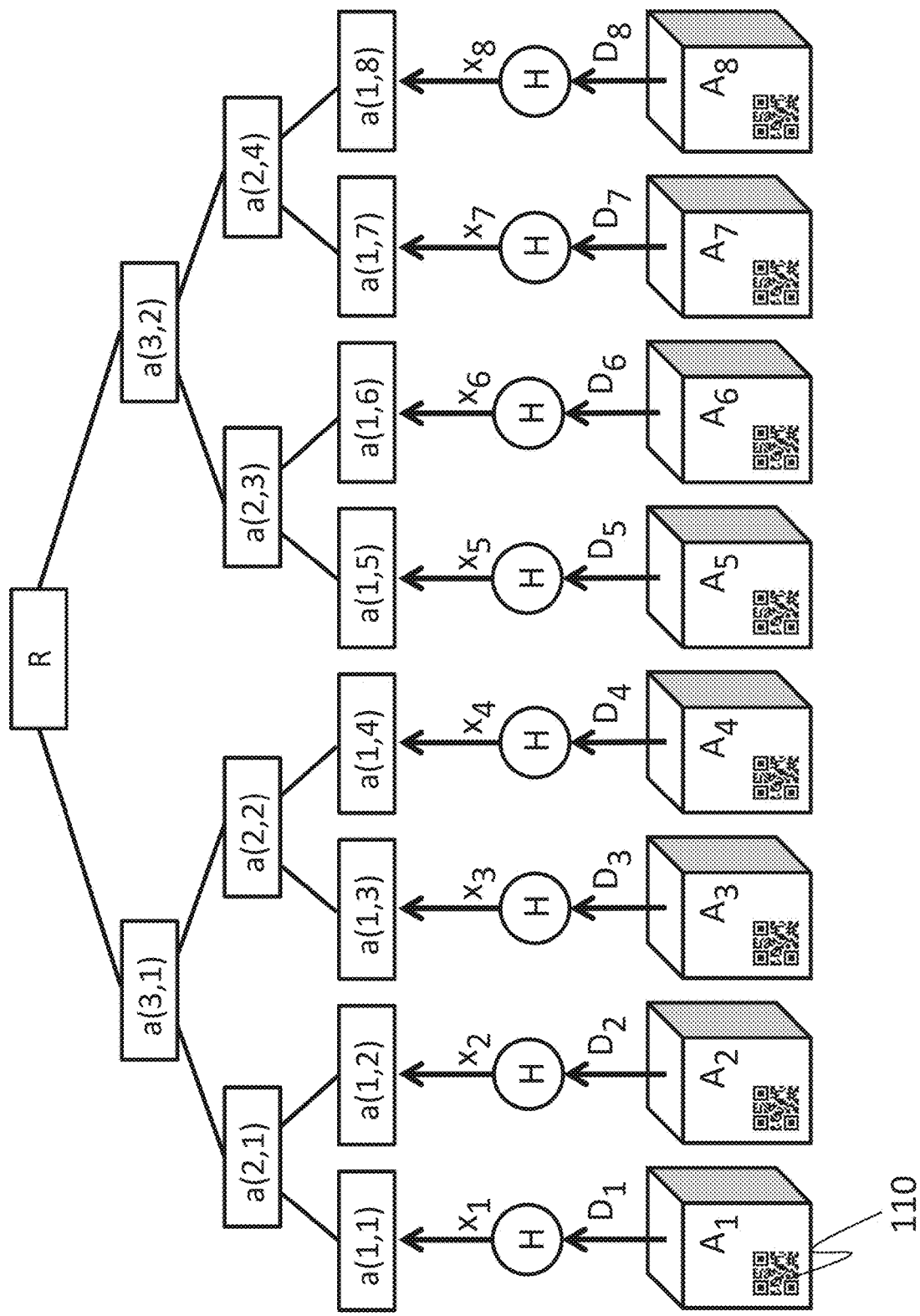
FIG. 1 is a schematic view of a general concept of securing a batch of articles according to the invention.

The present disclosure is here described in detail with reference to non-limiting embodiments illustrated in the drawings.

FIG. 1 illustrates a general concept of the invention relating to securing a batch of articles and a method of computing an encoding of verifying information that may be associated with each article. FIG. 1 illustrates a group or "batch" of articles and its associated tree wherein, for simplicity, only eight articles are shown: $A_1, \ldots, A_8$, which may be anything capable of bearing or containing a physical machine readable security marking 110 (here illustrated by a 2D barcode, but could be a 1D barcode or a RFID marking etc.) or of bearing something that in turn bears or contains the physical security marking. An article could be a manufactured item or its packaging, a physical document or image, a package containing several items (such as a blister pack of medicine), or a container containing pallets of cartons of goods etc. Even a person or animal could be an "article" in the sense of the embodiments of the invention; for example, authorized attendees at an event or members of a group, or members of a flock or herd, could carry some form of ID badge or (especially in the case of animals) be physically marked.

A batch might, for example, be a common manufacturing run, items delivered by a particular supplier, items made or shipped during a time period, a set of related images, a group of people, a flock or herd, or any other user-defined grouping of any objects for which data $A_i$ can be defined. Any one of the articles shown on FIG. 1 could be a "virtual article" $A_v$, which is an optional software construct that may be included to enable encoding of selected data. This is explained further below. For example, one of the eight articles, e.g. article $A_8$, may in fact be a virtual article $A_v$ that is counted as belonging to the batch of eight articles, and is treated as any one of the other seven real articles since it may be processed substantially in the same way (although it does not correspond to a real object). Of course, a plurality of virtual articles $A_{v1}, A_{v2}, \ldots, A_{vk}$ can be used for encoding digital data and produce more robust article digital signatures (see below).

For each article $A_1, A_2, \ldots, A_7, A_v$ of the batch (with $A_8 \equiv A_v$) respective article digital data $D_1, D_2, \ldots, D_7, D_v$ (with $D_8 \equiv D_v$) are associated or extracted (or, in the case of virtual article $A_v$, created) using any appropriate method. This data might be some measure of physical characteristics, textual data such as completed form or product information, a serial number or other identifier, indications of content, a digital representation of an image, or any other information that the system designer chooses to associate with an article. The article digital data $D_i$ may be extracted from human readable data (e.g. alphanumeric data) marked on an article (e.g. printed on the article or on a label affixed on the article) by means of a reader capable to produce a corresponding digital data file. Further digital data (e.g. instruction for use of the article or safety instructions etc.) can be associated with the extracted data to constitute the article digital data $D_i$.

For the virtual article $A_v$, the associated digital data may include, for example, a batch identification number, the number of articles in the batch, a (pseudo-) random number for the sake of increasing security by increasing data entropy, date and/or time information, etc. One other form of associated data might be indications of allowable or non-permissible operations rules, expiration dates, etc. In short, the digital data $D_v$ may be anything that can be represented in digital form.

For each article of the batch, its respective digital article data $D_1, D_2, \ldots, D_7, D_v$ is preferably transformed mathematically in such a way that it is essentially concealed, although this is not an absolute requirement for any embodiment. This transformation applied to the article digital data $D_i$ of an article $A_i$ serves to create a corresponding digital signature $x_i$. This digital signature is produced by means of a one-way function, i.e. a function easy to compute but hard to invert (see S. Goldwasser and M. Bellare "Lecture Notes on Cryptography", MIT, July 2008, http://www-cse.ucsd.edu/users/mihir).

One such advantageous transformation is, for example, applying a hash function $H(\ )=\text{hash}(\ )$ to the article digital data, which generally has the property that it returns an output of a known bit length regardless of the size of the input: this technical effect is particularly useful for creating a digital signature of digital data associated to an article, regardless of the size of the associated article digital data and that of the batch. The Hash function is a well-known example of a one-way function. If a cryptographic hash function such as the SHA (Secure Hash Algorithm) class of functions, for example, SHA-256, is used, then there are the additional benefits that the function is practically irreversible and collision resistant, that is, the probability is negligible that two different inputs will lead to the same output. As will be understood from the description below, this is also not a requirement of the invention, although it is advantageous for the same reasons as in other applications. As shown in FIG. 1, the values $x_1, x_2, x_3, \ldots, x_8$ are the hash values, i.e. the associated article digital signatures, of the respective article datasets, that is, $x_j = H(D_j)$, for $j=1, \ldots, 8$ (in case $A_8 \equiv A_v$, then $D_8 \equiv D_v$ and $x_8 \equiv x_v = H(D_v)$).

In order to shorten the signature, the article digital signature $x_j$ of article $A_j$ may even be just a sequence of a given plurality of bits of lower weights selected from the bits of the hash value $H(D_j)$: for example, with the SHA-256 hash function of the SHA-2 family, it suffices to retain only the 128 bits of lower weights from the 256 bits of the signature to still have a robust signature with respect to codebreaking attack.

FIG. 1 shows a batch of eight marked original articles $A_1, \ldots, A_8$, each having a corresponding security 110 marking applied on it, and illustrates the method of securing the articles and their respective associated article digital data $D1, \ldots D8$ by means of a tree of article digital signatures. Trees associated with digital signatures are well known (binary hash trees, n-ary hash trees, or Merkle trees), they generally have base nodes, or leaf nodes, which are used to build next (intermediate) level nodes by digitally signing a concatenation of the digital signatures associated with the leaf nodes according to a certain grouping of the leaf nodes. In case of a binary tree, the digital signatures associated with the first intermediate level nodes are respectively calculated by digitally signing (e.g. with a one-way hash function H, or a one-way elliptic curve function . . . ) a concatenation of the digital signatures associated with two consecutive leaf nodes. In case of a n-ary tree, the values of the first intermediate level nodes are obtained by concatenation of the values of n consecutive leaf nodes. A tree may as well have a more complex structure (mixed-trees) as the concatenation of the leaf nodes may be performed by pairs of consecutive nodes for certain leaf nodes, by triplet of nodes for other consecutive leaf nodes etc. For reasons of simplicity, a mere binary tree with eight leaf nodes is shown on FIG. 1: the respective values of the eight leaf nodes $a(1,1), \ldots, a(1,8)$ of the tree, respectively corresponds to the article digital signatures $x_1=H(D_1), \ldots, x_8=H(D_8)$. The value of the first index, i.e. "1", for all the leaf nodes indicates the first level (or base level) of the tree, and the second index running from 1 to eight indicates the (leaf) nodes ordering of the tree. The values of the next level (non-leaf) nodes, i.e. the four nodes of level two $a(2,1)$, $a(2,2)$, $a(2,3)$ and $a(2,4)$, are obtained by digitally signing a concatenation (symbolically represented by an operator "+"), here by means of a hash function, of the values of pairs of leaf nodes, i.e. pairs of their child nodes in the tree. This grouping of child nodes for obtaining the values of the nodes of the next level defines the tree concatenation ordering. For simplifying the notations, we use the node symbol $a(i,j)$ to also represent its associated value (i.e. its associated digital signature). Here, the tree has only two intermediate levels above the leaf nodes level, and the root node on top level. The root node level is in fact the last non-leaf node level of the tree. Thus, the values of the four non-leaf nodes of the next intermediate level are:

$a(2,1)=H(a(1,1)+a(1,2))$, i.e. $a(2,1)=H(H(D_1)+H(D_2))$, (as $a(1,1)$ and $a(1,2)$ are the child nodes of node $a(2,1)$)

$a(2,2)=H(a(1,3)+a(1,4))$ $a(2,3)=H(a(1,5)+a(1,6))$ $a(2,4)=H(a(1,7)+a(1,8))$ and, for the next, penultimate, node level (here, level three) there are two node values:

$a(3,1)=H(a(2,1)+a(2,2))$ $a(3,2)=H(a(2,3)+a(2,4))$.

We remark that it is possible to choose a different tree concatenation ordering for each non-leaf node: for example, instead of having $a(2,4)=H(a(1,7)+a(1,8))$ we could define $a(2,4)=H(a(1,8)+a(1,7))$, which gives a different node value.

Finally, the value of the root node R of the tree, or reference root digital signature, is obtained as: $R=H(a(3,1)+a(3,2))$.

Due to the cascade of concatenations involved in a tree, it is practically impossible to retrieve a root value if any bit of digital data is changed in a node (particularly, in a leaf node). Moreover, if some virtual articles are included in the batch (of which virtual article digital data are only known to the system having produced the digital signatures of the leaf nodes of the tree), a counterfeiter will not be capable to retrieve the root digital signature even if knowing the digital data of all the produced (and marked) articles of the batch.

According to the invention, the reference root digital signature R of the batch of articles is made immutable, and thus forgery-proof, by being published in a (public) media accessible to a user having to check the authenticity of an article (or its associated data), or stored in a searchable root database accessible to the user, or, in a preferred mode, stored in a blockchain (or in a database secured by a blockchain) accessible to the user. The user may then store the reference value R acquired from these available sources.

For each article $A_i$ of the batch, a corresponding article verification key $k_i$ (or verification path) of the associated tree is then computed as a sequence of the respective digital signatures, from the leaf nodes level to the penultimate nodes level, of every other leaf node having the same parent node in the tree that the leaf-node corresponding to the article digital signature, and successively at each next level in the tree, of every non-leaf node having the same parent node in the tree that the previous same parent node considered at the preceding level. In the example of FIG. 1, there are eight verification keys $k_1, \ldots, k_8$ respectively corresponding to the eight articles $A_1, \ldots, A_8$ of the batch and their corresponding eight leaf nodes $a(1,1), \ldots, a(1,8)$:

1) for leaf node $a(1,1)=x_1=H(D_1)$ corresponding to article $A_1$, the verification key is $k_1=\{a(1,2),a(2,2),a(3,2)\}$, from which the root digital signature value R can be retrieved via the following steps (executed according to the nodes ordering in the tree and the tree concatenation ordering):

i) from leaf node $a(1,1)=x_1$ and leaf node $a(1,2)=x_2$ in $k_1$ ($a(1,2)$ is the other leaf node having the same parent node, i.e. node $a(2,1)$, that the leaf node corresponding to the article digital signature $x_1$, i.e. node $a(1,1)$), the parent node value $a(2,1)$ is obtained by $a(2,1)=H(a(1,1)+a(1,2))$ (i.e. $a(2,1)=H(x_1+x_2)$), ii) from the obtained $a(2,1)$ and the next node value in $k_1$, i.e. $a(2,2)$ of next non-leaf nodes level, which is a non-leaf node having the same parent node in the tree, i.e. node $a(3,1)$, that the previous same parent node considered at the preceding level, i.e. node $a(2,1)$, the parent node value $a(3,1)$ is obtained by $a(3,1)=H(a(2,1)+a(2,2))$, iii) from the obtained $a(3,1)$ and the next node value in $k_1$, i.e. $a(3,2)$ of the penultimate nodes level, which is a non-leaf node having the same parent node in the tree, i.e. the root node, that the previous same parent node considered at the preceding level, i.e. node $a(3,1)$, the root node value R is obtained by $R=H(a(3,1)+a(3,2))$.

Remark: in this example we have three steps i), ii) and iii), because the tree has three levels below the root node level and thus, the verification key contains three node values.

Thus, the value of the root node of the tree can be obtained as: $R=H(H(H(a(1,1)+a(1,2))+a(2,2))+a(3,2))$.

2) for leaf node $a(1,2)=x_2=H(D_2)$ corresponding to article $A_2$, the verification key is $k_2=\{a(1,1),a(2,2),a(3,2)\}$, from which the root value R can be retrieved via the following steps (executed according to the nodes ordering in the tree and the tree concatenation ordering):

i) from $a(1,2)=x_2$ and $a(1,1)=x_1$ in $k_1$ ($a(1,1)$ is the other leaf node having the same parent node, i.e. node $a(2,1)$, that the leaf node corresponding to the article digital signature $x_2$, i.e. node $a(1,2)$), the parent node value $a(2,1)$ is obtained by $a(2,1)=H(a(1,1)+a(1,2))$, ii) from the obtained a(2,1) and the next node value in $k_2$, i.e. a(2,2) of next non-leaf nodes level, which is a non-leaf node having the same parent node in the tree, i.e. node a(3,1), that the previous same parent node considered at the preceding level, i.e. node a(2,1), the parent node value a(3,1) is obtained by a(3,1)=H(a(2,1)+a(2,2)), iii) from the obtained a(3,1) and the next node value in $k_2$, i.e. a(3,2) of the penultimate nodes level, which is a non-leaf node having the same parent node in the tree, i.e. the root node, that the previous same parent node considered at the preceding level, i.e. node a(3,1), the root node value R is obtained by R=H(a(3,1)+a(3,2)).

Thus, the value of the root node of the tree can be obtained as: R=H(H(H(a(1,1)+a(1,2))+a(2,2))+a(3,2)).

3) for leaf node a(1,3)=$x_3$=H($D_3$) corresponding to article $A_3$, the verification key is $k_3$={a(1,4),a(2,1),a(3,2)}, from which the root value R can be retrieved via the following steps (executed according to the nodes ordering in the tree and the tree concatenation ordering):

i) from a(1,3)=$x_3$ and a(1,4)=$x_4$ in $k_3$ (a(1,4) is the other leaf node having the same parent node, i.e. node a(2,2), that the leaf node corresponding to the article digital signature $x_3$, i.e. node a(1,3)), the parent node value a(2,2) is obtained by a(2,2)=H(a(1,3)+a(1,4)), ii) from the obtained a(2,2) and the next node value in $k_3$, i.e. a(2,1) of next non-leaf nodes level, which is a non-leaf node having the same parent node in the tree, i.e. node a(3,1), that the previous same parent node considered at the preceding level, i.e. node a(2,2), the parent node value a(3,1) is obtained by a(3,1)=H(a(2,1)+a(2,2)), iii) from the obtained a(3,1) and the next node value in $k_3$, i.e. a(3,2) of the penultimate nodes level, which is a non-leaf node having the same parent node in the tree, i.e. the root node, that the previous same parent node considered at the preceding level, i.e. node a(3,1), the root node value R is obtained by R=H(a(3,1)+a(3,2)).

Thus, the value of the root node of the tree can be obtained as: R=H(H(a(2,1)+H(a(1,3)+a(1,4)))+a(3,2)).

4) for leaf node a(1,4)=$x_4$=H($D_4$) corresponding to article $A_4$, the verification key is $k_4$={a(1,3),a(2,1),a(3,2)}, from which the root value R can be retrieved via the following steps (executed according to the nodes ordering in the tree and the tree concatenation ordering):

i) from a(1,4)=$x_4$ and a(1,3)=$x_3$ in $k_4$, the parent node value a(2,2) is obtained by a(2,2)=H(a(1,3)+a(1,4)), ii) from the obtained a(2,2) and the next node value in $k_4$, i.e. a(2,1) of next non-leaf nodes level, the parent node value a(3,1) is obtained by a(3,1)=H(a(2,1)+a(2,2)), iii) from the obtained a(3,1) and the next node value in $k_4$, i.e. a(3,2) of the penultimate nodes level, the root node value R is obtained by R=H(a(3,1)+a(3,2)).

Thus, the value of the root node of the tree can be obtained as: R=H(H(a(2,1)+H(a(1,3)+a(1,4)))+a(3,2)).

5) for node a(1,5)=$x_5$=H($D_5$) corresponding to article $A_5$, the verification key is $k_5$={a(1,6),a(2,4),a(3,1)}, from which the root value R can be retrieved via the following steps (executed according to the nodes ordering in the tree and the tree concatenation ordering):

i) from a(1,5)=$x_5$ and a(1,6)=$x_6$ in $k_5$, the parent node value a(2,3) is obtained by a(2,3)=H(a(1,5)+a(1,6)), ii) from the obtained a(2,3) and the next node value in $k_5$, i.e. a(2,4) of next non-leaf nodes level, the parent node value a(3,2) is obtained by a(3,2)=H(a(2,3)+a(2,4)), iii) from the obtained a(3,2) and the next node value in $k_5$, i.e. a(3,1) of the penultimate nodes level, the root node value R is obtained by R=H(a(3,1)+a(3,2)).

Thus, the value of the root node of the tree can be obtained as: R=H(a(3,1)+H(H(a(1,5)+a(1,6))+a(2,4))).

6) for node a(1,6)=$x_6$=H($D_6$) corresponding to article $A_6$, the verification key is $k_6$={a(1,5),a(2,4),a(3,1)}, from which the root value R can be retrieved via the following steps (executed according to the nodes ordering in the tree and the tree concatenation ordering):

i) from a(1,6)=$x_6$ and a(1,5)=$x_5$ in $k_6$, the parent node value a(2,3) is obtained by a(2,3)=H(a(1,5)+a(1,6)), ii) from the obtained a(2,3) and the next node value in $k_6$, i.e. a(2,4) of next non-leaf nodes level, the parent node value a(3,2) is obtained by a(3,2)=H(a(2,3)+a(2,4)), iii) from the obtained a(3,2) and the next node value in $k_6$, i.e. a(3,1) of the penultimate nodes level, the root node value R is obtained by R=H(a(3,1)+a(3,2)).

Thus, the value of the root node of the tree can be obtained as: R=H(a(3,1)+H(H(a(1,5)+a(1,6))+a(2,4))).

7) for node a(1,7)=$x_7$=H($D_7$) corresponding to article $A_7$, the verification key is $k_7$={a(1,8),a(2,3),a(3,1)}, from which the root value R can be retrieved via the following steps (executed according to the nodes ordering in the tree and the tree concatenation ordering):

i) from a(1,7)=$x_7$ and a(1,8)=$x_8$ in $k_7$, the parent node value a(2,4) is obtained by a(2,4)=H(a(1,7)+a(1,8)), ii) from the obtained a(2,4) and the next node value in $k_7$, i.e. a(2,3) of next non-leaf nodes level, the parent node value a(3,2) is obtained by a(3,2)=H(a(2,3)+a(2,4)), iii) from the obtained a(3,2) and the next node value in $k_7$, i.e. a(3,1) of the penultimate nodes level, the root node value R is obtained by R=H(a(3,1)+a(3,2)).

Thus, the value of the root node of the tree can be obtained as: R=H(a(3,1)+H(a(2,3)+H(a(1,7)+a(1,8)))).

8) for node a(1,8)=$x_8$=H($D_8$) corresponding to article $A_8$, the verification key is $k_8$={a(1,7),a(2,3),a(3,1)}, from which the root value R can be retrieved via the following steps (executed according to the nodes ordering in the tree and the tree concatenation ordering):

i) from a(1,8)=$x_8$ and a(1,7)=$x_7$ in $k_8$, the parent node value a(2,4) is obtained by a(2,4)=H(a(1,7)+a(1,8)), ii) from the obtained a(2,4) and the next node value in $k_8$, i.e. a(2,3) of next non-leaf nodes level, the parent node value a(3,2) is obtained by a(3,2)=H(a(2,3)+a(2,4)), iii) from the obtained a(3,2) and the next node value in $k_8$, i.e. a(3,1) of the penultimate nodes level, the root node value R is obtained by R=H(a(3,1)+a(3,2)).

Thus, the value of the root node of the tree can be obtained as: R=H(a(3,1)+H(a(2,3)+H(a(1,7)+a(1,8)))).

Generally, for retrieving a (candidate) root node value by starting from a given leaf node value and the node values specified in the verification key associated with said given leaf node, the following steps are performed:

extracting from the sequence of node values in the verification key, a node value (i.e. a digital signature value) of every other leaf node of the tree having the same parent node than that of the given leaf node and calculating a digital signature of a concatenation of the given node value and, respectively according to the ordering of nodes in the tree and the tree concatenation ordering, the extracted node value of said every other leaf node, thus obtaining a digital signature of said same parent node of the given leaf node;

successively at each next level in the tree and up to the penultimate nodes level:

extracting from the sequence of node values in the verification key, a node value of every other non-leaf node of the tree having the same parent node than that of the previous same parent node considered at the preceding step, and calculating a digital signature of a concatenation of the node value of said respective every other non-leaf node and the obtained digital signature of said previous same parent node, according to the ordering of nodes in the tree and the tree concatenation ordering, thus obtaining a node value of said same parent node of said previous same parent node; and calculating a digital signature of a concatenation of the obtained node values of the non-leaf nodes corresponding to the penultimate nodes level of the tree according to the ordering of nodes in the tree and the tree concatenation ordering, thus obtaining a root digital signature of the root node of the tree.

As it is clear from the above example, the root node value R can finally be retrieved from any given leaf node value by a digital signature of a concatenation of this leaf node value with only the node values specified in the corresponding verification key. Thus, the volume of data in the verification information that is necessary for retrieving the root node value is clearly much lower than the volume of data necessary for calculating the reference root node value (i.e. based only on the leaf node values, by calculating all the non-leaf node values of the intermediate levels of the tree): this is an advantage of the invention in view of the constraint of limited size available on a security marking (like a two-dimensional barcode).

According to the invention, the security marking 110 (possibly tamperproof) applied on an article $A_i$ of a batch of articles includes the verification information $V_i$ that allows both online and offline checking operations of authenticity of the marked article, of conformity of its associated data with respect to that of the genuine marked article, or even conformity of an image of the article with respect to that of the genuine marked article, by providing a unique, immutable and forgery-proof link between the article data $D_i$ and belonging of the marked article $A_i$ to a given batch of genuine articles, while keeping a bit size of a digital representation of this verification information $V_i$ at a level compatible with a data content of a two-dimensional machine readable barcode that can be easily read by a conventional reader: this verification information comprises the article digital data $D_i$ and the corresponding verification key $k_i$, $V_i=(D_i,k_i)$. The checking operations includes retrieving the batch value, or reference root digital signature R of the tree associated with the batch, by first reading the article digital data $D_i$ and the corresponding verification key $k_i$ on the machine readable security marking 110 (or on an image of the security marking) on article $A_i$ (respectively, on the image of $A_i$), then calculating a candidate article digital signature $X_i$ by means of a one-way function of the read article digital data $D_i$ as $X_i=H(D_i)$, and calculating a candidate root digital signature $R^c$ as explained above from a digital signature of a concatenation of $X_i$ and node values of the tree according to the sequence of node values indicated in the verification key $k_i$. This securing scheme, which has the advantage of not necessitating data encryption and thus, management of encryption/decryption keys (particularly, no cryptographic key is included in the security marking), is much more robust with respect to codebreaking attack compared to conventional encryption of data by means of public encryption key-private decryption key (like RSA "Rivest-Shamir-Adleman" system, for example). As a result, the size of digital data to be represented in the security marking according to the invention is compact and allows to use conventional 2D barcodes (e.g. a QR code), and thus conventional barcode readers (or even a mere programmed smartphone having a camera), while providing a very high level of robustness against codebreaking attacks. Moreover, this security marking is compatible with both online (via a server communicating with a code reader) and offline (via a programmed code reader) check of authenticity of a marked article and conformity of its data with respect to that of a genuine article. Also, according to the invention, the representation of digital data $D_i$ and that of key data $k_i$ may differ, the data concatenation scheme and/or the one-way function may depend on node level in the tree, which provide additional levels of robustness with respect to codebreaking attacks.

Preferably, in order to further reduce the size of digital data (i.e. verification information V) to be included in a security marking, if the article digital data $D_i$ of the respective original articles $A_i$ of the batch are spread between given fields that are common to all the articles of the batch, digital data relating to these fields are not included in each article digital data Di but are clustered in a separate fields data block FDB associated with the batch of articles, and:

the article digital signature $x_i$ of an original article $A_i$ of the batch is then calculated with the one-way function H of a concatenation of the corresponding article digital data $D_i$ and the digital data of the fields data block FDB, i.e. $x_i=H(D_i+FDB)$; and the reference root digital signature R is made available to the user together with the associated fields data block FDB (which makes the fields data block also immutable).

In a variant of the invention, the fields data block FDB is made accessible to the user independently of the reference root digital signature.

The above size reduction is possible in most cases, as most of data associated with the articles of a batch are classified in accordance with some fields for structuring the data: e.g. for a pharmaceutical product, the indications "serial number", "expiry data" etc., only the data associated with these fields are included in $D_i$ (e.g. 12603, May 2020 etc.) while the common names of the fields "serial number", "expiry data" etc. are in the fields data block FDB.

There are different types of physical (security) markings that could be used to encode the verification key and the article digital data (or any other data). Many marking systems that are practical for use on small items, however, or on services that are not able to receive physical markings with high resolution, cannot encode a large amount of data.

One way to solve this problem would be to include multiple markings, each including one or more of the elements of the verification vector. In many cases, this is impractical because of lack of physical space or unsuitability of the mark surface, or simply because it would be aesthetically unacceptable.

There are many known methods for encoding information in a way that it can be applied to physical surfaces. Any such method may be used in implementations of any embodiment of this invention. One common form of physical marking is a well-known QR code. As is well known, for a given area, the more data a QR code is able to encode, the higher the module density (roughly, density of black/white "squares") it has and the greater resolution it requires to print and read. In addition to its density (in number of modules squared), QR codes are also generally classified depending on what level of error correction they include. At present, the four different standard "levels", L, M, Q, and H, each representing the degree of "damage", that is, data loss, the QR code image can sustain and recover from. The levels L, M, Q, and H can sustain roughly 7%, 15%, 25% and 30% damage, respectively.

The following table shows at least approximate values for different QR code versions:

| VVersion | SSize (in modules) | Number of encodable bits | |
|---|---|---|---|
| | | EECC level L | EECC level H |
| 110 | 557 × 57 | 22192 | 9976 |
| 225 | 1117 × 117 | 110208 | 44304 |
| 440 | 1177 × 177 | 223648 | 110208 |

Not all of the bits may be used to encode a data "load", however, since some modules are used for scan targets, a mask pattern, and the error-correction modules. There is thus a trade-off between the amount of information that a QR code (or whatever marking 110 is used) can encode, and how much information is included in a verification information V and must be encoded.

For a chosen type of security marking 110 (such as a QR code), with a limited encoding capacity, a suitable one-way function H should therefore also be chosen: a function of which output is too large in terms of required bits may be impossible to use at all, and a function of which range is too small may not be secure enough. Moreover, in many applications, scalability may be an issue. For example, some data security schemes involve signatures that grow as the number of members of a batch increases, and that could impermissibly limit the size of a batch from the perspective of how many bits the security marking 110 can encode. This is why, according to a preferred mode of the invention, the type of function chosen is the one-way hash function of the SHA-2 family.

A computation module (not shown) is preferably included within a securing system to execute the code provided for performing the computations for digitally signing the article digital data of the articles of a batch, for determining the verification keys for the different articles, and for calculating the reference root digital signature of the corresponding tree. The securing system may also include suitable modules for inputting (pre-programmed) values corresponding to the digital data $D_v$ of the virtual article(s) $A_v$. It would also be possible to perform the article-related hashing computations externally (e.g. on a connected distant server), for example, wherever the articles are made, so as to avoid having to transmit raw article data $D_i$ over a network from that site (or sites) to the securing system, if that is a concern.

For each article $A_i$, corresponding verification information $V_i$ is compiled and is encoded (represented) in some form of machine readable security marking 110 that is then applied physically to or otherwise associated with the respective article. For example, $V_i$ could be encoded on an optically or magnetically readable label, RFID tag, etc., that is attached to the article, or is printed directly on the article or its packaging. As another option, the marking could be on the inside of the article or its packaging if appropriate, either using direct application or, for example, being included on some form of documentation that is inside the packaging.

For any "virtual" article $A_v$, its corresponding verification information $V_v=(D_v,k_v)$ may be associated internally with it by the securing system. The verification information generally at least includes, for any article $A_i$ of a batch of articles, the corresponding article digital data $D_i$ and the corresponding verification key $k_i$: i.e. $V_i=(D_i,k_i)$.

Additional article data may further be associated with an article and may include, for example, the batch value, i.e. reference root digital signature R, or any other information the system designer (or system administrator) chooses to include, such as an item serial number, batch ID, date/time information, product name, a URL that points to other, online information associated with either the individual item (such as an image of the article, or of its labelling or packaging, etc.), or the batch, or the supplier/manufacturer, a telephone number one may call for verification, etc. The additional article data may be stored in a searchable information database accessible to a user (via an information database interface).

Once the verification $k_i$ of an original article $A_i$ has been calculated, and included (i.e. via encoding or any chosen data representation), together with the corresponding article digital data $D_i$, in the machine readable article security marking 110 applied on the article $A_i$, the resulting marked original article and its associated article data are in fact secured against forgery and tampering.

A user, recipient of an article such as $A_i$ for example, may then scan (or otherwise read) with an imager the security marking on $A_1$ and extract the article digital data $D_1$ and the verification key $k_1$, (and any other information that may have been encoded into the marking). For the sake of verification of the marked article $A_1$, the user must first retrieve the verification information $V_i=(D_1,k_1)$ from the security marking 110 on $A_1$ and thus, calculate the digital signature $x_1$ from the extracted article digital data $D_1$: to do that the user must know the one-way function to be used for calculating an article digital signature, here the one-way function H( ) (e.g. a SHA-256 hash), and then perform the operation $x_1=H(D_1)$ to obtain the full data $(x_1,k_1)$ necessary to calculate a corresponding candidate root digital signature $R^c$. The user may for example receive the one-way function securely (for example, using a public/private key pair) or by requesting this from the article provider or whichever entity having created the signatures and keys, or having it already programmed in a user's processing unit of its imager.

Next, in order to calculate such candidate root digital signature $R^c$, the user will need to further know the type of data concatenation scheme (for concatenating node values via H(a(i,j)+a(i,k)) to be used for that: the user may receive this information in any known manner, either securely (for example, using a public/private key pair) or simply by requesting this from the article provider or whichever entity created the verification data, or having it already programmed in the user's processing unit. However, the concatenation scheme my in fact correspond to a mere conventional joining end-to-end of the two digital data blocks respectively corresponding to the two node values: in this case, no specific scheme must be transmitted to the user. In some variants, the concatenation scheme may further insert a concatenation block, which may contain data specific to the rank or level of the concatenated digital data blocks in the tree, with the result of making even more difficult a codebreaking attack.

Knowing the data concatenation scheme, the user can then compute (e.g. via the suitably programmed imager) the candidate root digital signature $R^c$ as explained above by step by step digitally signing a concatenation of the article digital signature $x_1$ and node values according to the sequence of nodes specified in the verification key $k_1$, see above item 1) relating to node a(1,1), executed according to the nodes ordering in the tree and the tree concatenation ordering. Here, the candidate root digital signature is obtained as (the nodes ordering in the tree being given by the respective indexes (i,j) of the level and rank in the level):

$R^c=H(H(H(a(1,1)+a(1,2))+a(2,2))+a(3,2))$.

This calculated candidate root digital signature $R^c$ should then be equal to the available (or published) reference R value: this value may have been previously acquired by the user and/or already stored in a memory of the imager's processing unit, it could also be a value that the recipient requests and receives from the system administrator in any known manner. If the candidate $R^c$ and the available reference root digital signatures R match, this computation then verifies the information in the secure marking 110 and confirms that the article $A_1$ is from the right batch. The secure marking should preferably be made and/or applied to the article in any difficult-to-copy and/or difficult-to-remove (tamperproof) manner. In this case, a matching of the root digital signatures can then indicate to the user that the article is likely authentic. This is particularly interesting because authentication of article $A_1$ does not necessitate its material authentication, i.e. via an intrinsic physical characteristic of $A_1$ or by means of a specific material-based security marking applied on $A_1$.

A link to access the reference root digital signature R for the batch corresponding to the article $A_1$ could be included in the security marking 110 (for example, a web address, if R can be retrieved on a corresponding web site), although it is not a preferred variant.

In some implementations, recipients of an article $A_i$ may be capable of "visually" extracting the article data corresponding to the digital article data $D_i$ directly from the article. For example, the article data might be textual, such as a serial number, or text in a descriptive writing, or some alphanumerical encoding elsewhere on the article or its packaging and human readable from the articles themselves or something attached to or included in them. Recipients of articles could also be provided with appropriate software, such as a module in an imager device such as a smart phone that either inputs data, or reads data optically via the phone camera, and which then computes $x_i=H(D_i)$ for the article at hand. For example, with a security marking 110 on article $A_1$ being a standard QR code, a user could easily obtain by scanning the QR code with an imager, using a standard QR code reader application running on the imager, the digital data $D_1$ and $k_1$, a verification application in the user's imager could then compute $x_1$ and $R^c$, and compare this value with the available reference batch value R, as explained above.

Preferably, the reference root digital signature (i.e. "batch value") R is stored in a searchable root database that can be accessed (via a communication link) by the user by means of its imager equipped with a communication unit, as this is the case with the above example of a smart phone. The user having to verify the article $A_1$ can just send a root request with its smart phone to the address of the database, via an access interface of the database, the request containing the article data $D_1$ read on the security marking 110 on $A_1$ (or the calculated digital signature $x_1=H(D_1)$) allowing to retrieve the corresponding reference batch value R, and the access interface will return the reference root digital signature R to the smart phone. The database may be secured by a blockchain in order to strengthen the immutability of the stored root digital signatures. An advantage of the invention is to make the link between a physical object, i.e. an original article, and its attributes, i.e. the associated article data and its belonging to a specific batch of articles, practically immutable through the corresponding root digital signature.

The above mentioned verification process of an article $A_i$ may also serve to authenticate human readable article data further marked on $A_i$ on a corresponding article data marking applied on $A_i$, or printed on a packaging of $A_i$, or on a leaflet. Indeed, a user can read, e.g. on a display of the imager, the corresponding article digital data $D_i$ as read on the security marking on the article $A_i$ and decoded by the imager, and visually check that the displayed information is consistent with the article data on the article data marking.

In a preferred embodiment, the article data, or its corresponding article digital data $D_i$, further include (unique) characteristic digital data (CDD) of a unique physical characteristic of the marked original article $A_i$ that can be used for (materially) authenticating $A_i$. Thus, with the characteristic digital data corresponding to the physical characteristic of an article $A_i$ being $CDD_i$, the corresponding unique physical signature data $UPS_i$ can be obtained by encoding of $CDD_i$ (preferably by means of a one-way function): for example, by taking a hash of the digital data $CDD_i$, i.e. $UPS_i=H(CDD_i)$. However, any other known encoding could be used instead: for example, in order to have a short signature, it is possible to use an elliptic curve digital signature algorithm. As an illustrative very simplified example of characteristic digital data $CDD_i$ corresponding to a unique physical characteristic of an article $A_i$, we consider a mere digital image obtained by imaging the article $A_i$ (or a specific zone on $A_i$), the corresponding unique physical signature data $UPS_i$ being, for example, a hash of the digital image, $UPS_i=H(CDD_i)$. The characteristic digital data $CDD_i$ having generated the signature $UPS_i$ constitutes the reference characteristic digital data for $A_i$ and the obtained signature $UPS_i$ is the corresponding reference physical signature data for $A_i$. Preferably, $UPS_i$, i.e. the reference physical signature data for article $A_i$, is stored in a searchable database or in a blockchain (or in a database secured by a blockchain) accessible to the users (for example, via a request containing the article digital data $D_i$ read on the security marking of $A_i$, or its corresponding digital signature $x_i$). Thus, the stored $UPS_i$ acquires an immutable character. A copy of $CDD_i$ may be further stored in the memory of the user's imager. In a variant of the embodiment, a copy of $UPS_i$ may also be further stored in the memory of the user's imager (to allow offline checking operation).

A check of authenticity of an article $A_i$ may be performed by extracting candidate characteristic digital data $CDD_i^c$ from the digital data $D_i$ read (here, with a decoding application running on the imager, which may be a smartphone for example)) on the security marking on article $A_i$, and comparing it with the reference characteristic digital data $CDD_i$ stored in the memory of the imager: in case of matching $CDD_i=CDD_i^c$ the article $A_i$ is considered as genuine (its digital content corresponds to that of a genuine marked original article). If the reference characteristic digital data $CDD_i$ is not stored in the memory of the imager, but instead the reference unique physical signature data $UPS_i$ is stored in the memory of the imager (with the advantage of taking up much less memory compared with $CDD_i$), then the authenticity of $A_i$ can still be checked by verifying that the candidate unique physical signature data $UPS_i^c$ obtained by calculating the hash value of the candidate unique physical characteristic digital data $CDD_i^c$ extracted from the digital data $D_i$, i.e. $UPS_i^c=H(CDD_i^c)$, matches the reference unique physical signature data $UPS_i$ stored in the memory.

A user may further check the authenticity of a received article $A_i$, still via offline (self-verifying) process, by detecting said unique physical characteristic on $A_i$, by means of a sensor capable to perform such measurement (here, the imaging unit of the imager), and obtaining a candidate characteristic digital data $CDD_i^c$ from the detected characteristic (here, a digital image taken by the imager). Then, the user can compare (via the image processing unit of its imager, or visually on a display of the imager) the obtained $CDD_i^c$ with a copy of the reference $CDD_i$ (stored in the memory of the imager): in case of "reasonable" matching $CDD_i^c \approx CDD_i$ (i.e. the two digital data agree within some given tolerance or similarity criterion), the article $A_i$ is considered as genuine.

Moreover, the user may also further calculate the corresponding candidate physical signature data from the copy of the reference $CDD_i$ stored in the memory of the imager as $UPS_i^c=H(CDD_i)$, and compare it with the reference physical signature data $UPS_i$ stored in the memory of the imager: in case of matching $UPS_i^c=UPS_i$, the article $A_v$ is confirmed as being genuine with an even higher degree of confidence. Moreover, in case of matching, the article digital data $D_i$ associated with $A_i$, which has been verified as corresponding to that of a genuine article, as explained above by retrieving the corresponding reference batch value R from the read verification information $(D_i,k_i)$ on the security marking on $A_i$, is also authenticated. In a preferred mode, the copy of the reference characteristic digital data $CDD_i$, instead of being stored in the memory of the user's imager, is part of the article digital data $D_i$ included in the security marking on article $A_i$ and can be obtained by reading it on the security marking (with the imager). However, in a variant (still compatible with offline verification), the copy of the reference characteristic digital data $CDD_i$ may instead be included in the article data marking applied on article $A_i$ (and readable by the user's imager).

In a variant of the embodiment, the checking of authenticity of an article $A_i$ by a user may be performed via online process: in this case, the reference data $CDD_i$ and/or $UPS_i$ are stored in a searchable database accessible to the user wherein the reference data relating to an article $A_i$ is stored in association with, respectively, the corresponding article digital data $D_i$ (included in the security marking on $A_i$) or with the corresponding article digital signature $x_i$ (that can be calculated by the user once the data $D_i$ is extracted from the security marking via the operation $x_i=H(D_i)$ and can be requested by sending to the database a query containing, respectively, $D_i$ or $x_i$.

Of course, any other known intrinsic physical/chemical property can be used to obtain the characteristic digital data $CDD_i$ of an article $A_i$, and the corresponding unique physical signature data $UPS_i$. As another illustrative example, it is possible to print the 2D barcode forming the security marking 110 on an original article with a security ink including a luminescent pigment having its characteristic decay time constant as well as its light excitation wavelength window and its luminescence emission wavelength window: the result is an ink having a specific reference decay time value $\tau$ that serves as a material "fingerprint" of the ink. It suffices to illuminate the security marking 110 with excitation light in an illumination wavelength window covering the pigment excitation wavelength window, and collect a resulting luminescence light from the security marking with a sensor capable to detect light intensity within the luminescence emission wavelength window in order to authenticate the security marking. For example, the user's imager may be equipped with a flash capable to deliver the excitation light to the security marking, a photodiode capable to collect the corresponding luminescence light intensity profile I(t) (over a detection time interval) from the security marking, and the imager's processing unit being programmed to calculate a decay time value from the collected intensity profile I(t). For example, the excitation wavelength window may be within the UV (ultra violet) band and the emission wavelength window within the IR (infra red) band. If, during verification of the article, the luminescence light intensity collected by the user's imager shows a characteristic decay over time corresponding to a candidate decay time $\tau_c$, then the ink, and consequently the security marking, is considered as genuine if $\tau_c \approx \tau$ (within a given range of tolerance). In this case, the digital data $CDD_i$ of a marked article $A_i$ includes at least the reference decay time value $\tau$ (and possibly data relating to the excitation wavelength window and the emission wavelength window). As it is clear from the above examples, including reference characteristic digital data in the verification information of a security marking has the technical effect of providing a forgery-proof link between the digital data of an article and the (material) authentication data of this very article.

Figure 2A:
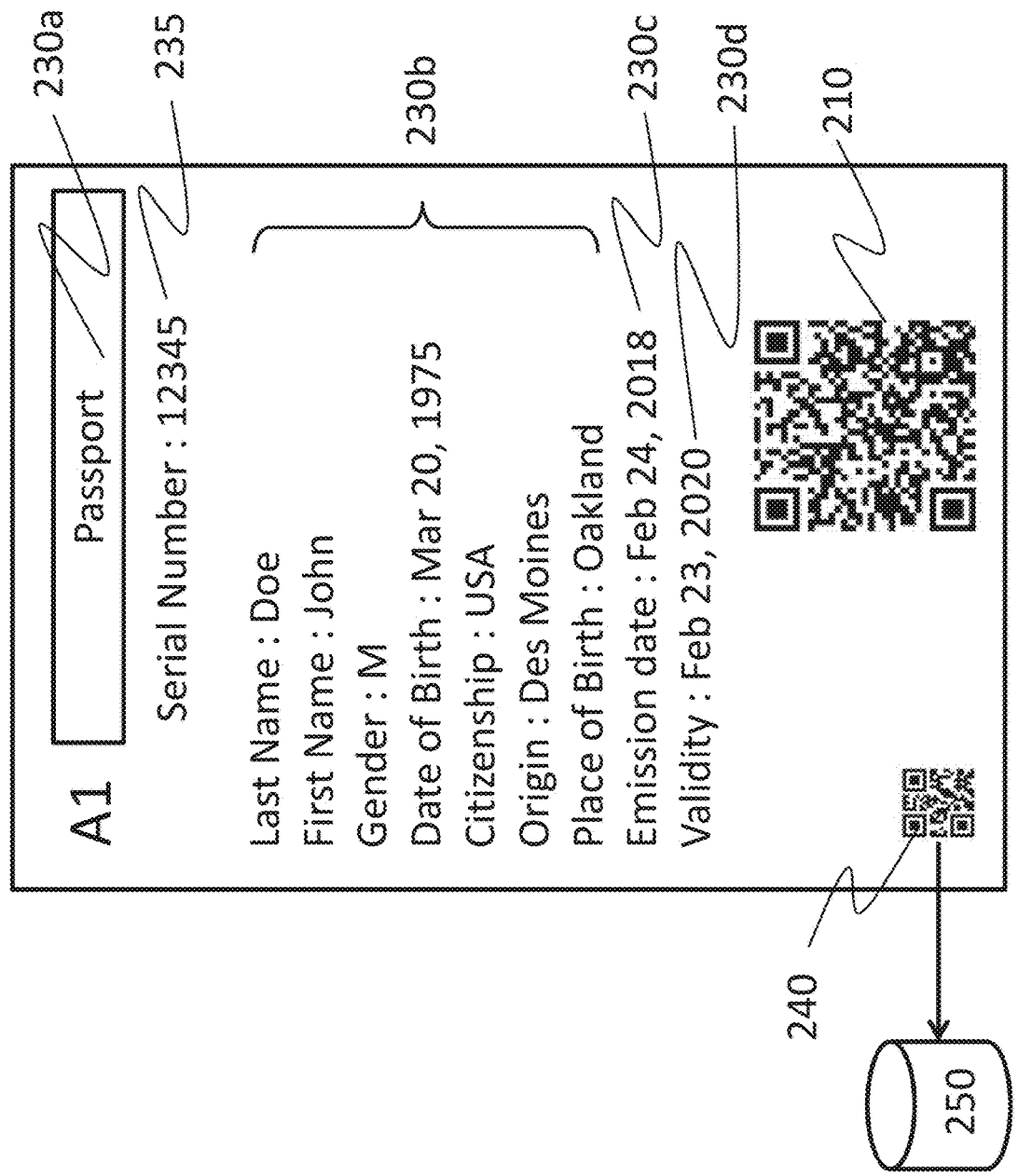
FIG. 2A illustrates a secured biometric passport as an example of biometric identity document secured according to the invention.

Another illustrative embodiment of the invention relates to a batch of biometric identification documents, e.g. biometric passports, as shown on FIG. 2A.

In this example we still use a hash function as a one-way function for signing the passport data, preferably a SHA-256 hash function in view of its well-known robustness. Indeed, in view of a given size of the batch, the hash function that is selected (having its known bucket listing) for the purpose of signing the passport data is thus an example of a one-way encryption function such that each distinct passport has its distinct signature, which thus make the signature unique. The domain of a hash function (i.e. the set of possible keys) being larger than its range (i.e. the number of different table indices), it will map several different keys to a same index which could result in collisions: such collisions can be avoided, when the size of the batch is known, by considering the bucket listing associated with the hash table of a hash function and retaining only a function giving zero collisions, or by independently choosing a hash-table collision resolution scheme (for example, such as coalesced hashing, cuckoo hashing, or hopscotch hashing).

FIG. 2A shows an example of biometric passport $A_1$ secured with a machine readable security marking 210 (here a QR code), and comprising a passport data marking 230 containing conventional passport data, i.e. visible printed data such as a title of the document 230a ("Passport"), a set of biography data of the owner of the passport 230b: last name ("Doe"), first name ("John"), gender ("M"), date of birth ("Mar. 20, 1975"), citizenship ("USA"), origin ("Des Moines"), place of birth ("Oakland"), a date of emission of the passport 230c ("Feb. 24, 2018") and a validity period 230d ("Feb. 23, 2020"). These passport data may further comprise some (unique) serial number(s) 235 assigned by the authority delivering the passport (here "12345"). The passport data further comprise biometry data of the owner of the passport as data corresponding to a unique physical characteristic of an individual associated with the passport. A machine readable representation 230e (e.g. an alphanumeric one) of data characterizing said unique physical characteristic (not shown), corresponding to said biometry data, is associated with the passport data 230. A representation of digital data is to be understood in a broad sense of the term: this representation of data only needs to enable retrieving the original digital data. The machine readable data representation 230e, i.e. the biometry data, of the unique physical characteristic may correspond, for example, to fingerprint identification data or iris identification data of the owner of the passport. For example, biometry data 230e corresponding to a fingerprint of a person may result from an analysis of a set of specific minutia features of fingerprint ridges like ridge ending, bifurcation and short ridges (according to the conventional Henry System of Classification).

Thus, for a given passport $A_j$ of a batch of $\mu$ delivered biometric passports (here $\mu$=1024) the associated passport digital data $D_j$ includes the digital data corresponding to the above mentioned data 230a-230e.

In a variant of the embodiment, the associated passport digital data $D_j$ may only include the values of the fields which are common to all the delivered passports, while the fields in common, i.e. "Passport", "Last Name", "Gender", "Date of Birth", "Citizenship", "Origin", "Place of Birth", "Emission date" and "Validity" are included in a separate fields data block FDB as explained above: for example, $D_1$ only contain a representation of the field values "Doe", "John", "M", "Mar. 20, 1975", "USA", "Des Moines", "Oakland", "Feb. 24, 2018" and "Feb. 23, 2020".

Preferably, additional passport digital data are associated with the above mentioned passport data 230. For example, a digital image of the fingerprint pattern of the owner of the passport, or a digital identity photograph etc. In a variant of the embodiment, these additional passport digital data are stored in a searchable information database 250 that can be searched via an information request containing some passport data (for example, the name of the owner or the biometry data or data from the security marking or the unique serial number 235) to retrieve the corresponding fingerprint pattern data and receive it back. Preferably, a link to the information database 250 is included in an information access marking 240 applied on the passport: here this is a QR code containing a reference index to retrieve corresponding additional data in the information database 250. However, in a variant of passport control operation involving access to a distant information database (online operation), the QR code could contain, for example, the URL of the information database that is accessible via the web.

A digital signature with a one-way hash function of the passport digital data $D_j$ corresponding to the passport data 230a-230e of the passport $A_j$ is then calculated by means, for example, of the above mentioned robust SHA-256 hash function to obtain the corresponding (unique) passport digital signature $x_j=H(D_j)$. In a same way, the passport digital signatures of all the passports in the batch, for all the different owners, are calculated.

From all the signatures of the passports in the batch, a reference root digital signature R is calculated according to a tree ordering and tree concatenation ordering of an associated (binary) tree, as explained above. As there are $\mu$=1024 passports in the batch, the corresponding binary tree has 1024 leaf nodes $a(1,1), \ldots, a(1024)$ for the first level, 512 non-leaf nodes $a(2,1), \ldots, a(2,512)$ for the second level, 256 non-leaf nodes $a(3,1), \ldots, a(3,256)$ for the third level etc. . . . , up to the penultimate nodes level (here, level 10) with non-leaf nodes $a(10,1)$ and $a(10,2)$, and the top node corresponding to the root node R (level 11 of the tree). The leaf-node values are $a(1,j)=x_j=H(D_j)$, $j=1, \ldots, 1024$, the second level node values are $a(2,1)=H(a(1,1)+a(1,2)), \ldots, a(2,512)=H(a(1,1023)+a(1,1024))$, etc., and the reference root digital signature R is $R=H(a(10,1)+a(10,2))$. Each verification key $k_j$ is thus a sequence of 10 node values. The security marking 210 applied of the passport $A_j$ includes the passport digital data $D_j$ and the corresponding verification key $k_j$ (i.e. the verification information $V_j=(D_j,k_j)$).

The operation of checking that the passport digital data $D_j$ and the verification key $k_j$ in the security marking 210 of a biometric passport $A_j$ indeed correspond to passport data of a genuine biometric passport belonging to the batch of $\mu$ biometric passports having the batch value R only necessitates calculating the passport digital signature $x_j=H(D_j)$ and verifying that $x_j$ and the verification key $k_j$ allow retrieving the available corresponding reference root digital signature R via the composition of ten times (as here, the tree has ten levels below the root level) a hash function of a concatenation of the node value $a(1,j)$ and the node values in $k_j$ (according to the nodes ordering in the binary tree and the tree concatenation ordering with the conventional concatenation scheme). Consequently, a biometric passport secured according to the invention provides both a forgery-proof link between the "personal data" and the "biometry data" of its holder, and a unique and forgery-proof link between the physical person of the holder and the holder's identity.

Figure 2B:
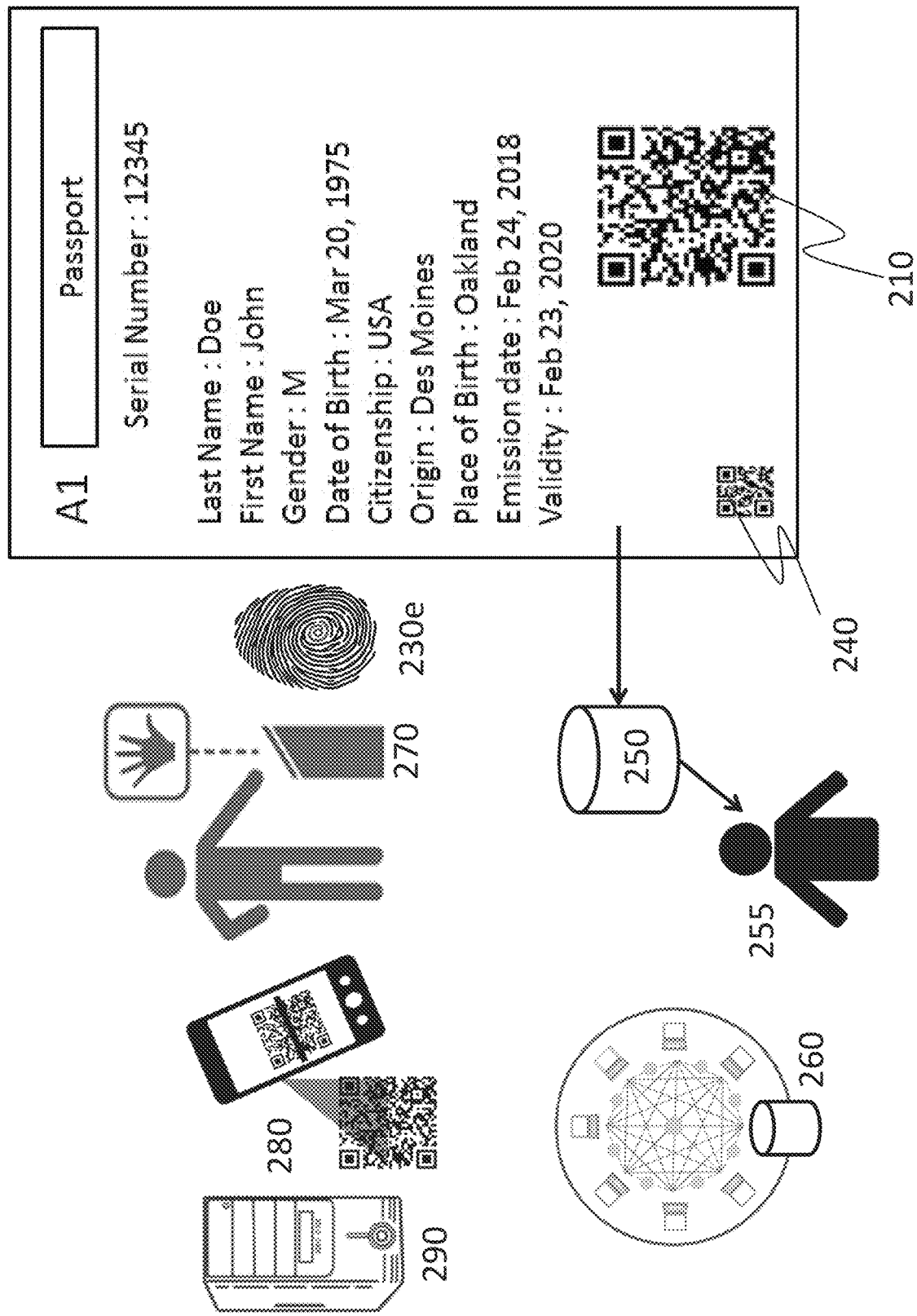
FIG. 2B illustrates a control of an individual having the secured biometric passport of FIG. 2A by an authorized officer.

FIG. 2B illustrates a control process of the secured biometric passport $A_1$ of FIG. 2A, with its passport data marking 230 corresponding to a certain John Doe, with its biometry data 230e corresponding to John Doe's fingerprint, and with additional passport digital data corresponding to a digital identity photograph 255 of John Doe that is accessible via the link to the information database 250 included in the information access marking 240. The passport data further comprises the unique serial number 235 assigned by the authority having delivered the passport. The security marking 210 applied on the passport $A_1$ contains the verification information $(D_1,k_1)$, with passport digital data $D_1$ corresponding to the printed passport data 230a-230d, the biometry data 230e and the unique serial number 235, and the verification key $k_1$ corresponding to the sequence of 10 node values $\{a(1,2), a(2,2), \ldots, a(10,2)\}$ which are necessary for retrieving the root value R from node value $a(1,1)$ of passport $A_1$ (with $a(1,1)=x_1=H(D_1)$). The reference root digital signature R may be time-stamped and stored in a blockchain 260. In this example, the biometry data 230e of the respective holders of the biometric passports of the batch are also stored in the blockchain 260 in association with, respectively, their corresponding unique serial numbers (so as to make these data immutable). The stored biometry data of John Doe can be retrieved by sending a request to the blockchain 260 indicating the unique serial number 235 mentioned on his passport. The authorities in charge of controlling identity of people (for example, the police, the customs etc.) can access the blockchain 260 via a communication link, and, in this illustrative embodiment, have also local storage capabilities for storing the (published) root digital signatures of all the delivered batches of biometric passports. In the example shown on FIG. 2B, the information database 250 is local (i.e. directly accessible to the authorities, without having to use a public communication network). Moreover, these authorities are equipped with fingerprint scanners 270 to capture the fingerprints of individuals and calculate corresponding machine readable representations of data characterizing the captured fingerprints, i.e. biometry data 230e.

During an identity control of John Doe, say by a police or a customs officer, the officer takes the secured biometric passport $A_1$ of John Doe, reads and decodes the verification information $(D_1, k_1)$ stored in the security marking 210 on the passport by means of an appropriate handheld reader 280 connected to a computer 290 (forming an imager), the computer being connected to the local storage capabilities 250. Having read the passport digital data $D_1$ and the verification key $k_1$ and sent it to the computer 290, a dedicated application (with programmed hash function H and concatenation of node values) running on the computer 290 calculates the passport digital signature $x_1$ (as $x_1$=H($D_1$)) and a candidate batch value $R^c$ as:

H(H(H(H(H(H(H(H(H(H(a(1,1)+a(1,2))+a(2,2))+ . . . )+ . . . )+ . . . )+ . . . )+ . . . )+ . . . )+a(9,2))+a(10,2)),

- i.e. the composition of ten times a hash function of a concatenation of the node value a(1,1) and the node values in $k_1$={a(1,2), a(2,2), . . . , a(10,2)}. Then, the computer can, for example, search in the local information database 250 a reference root digital signature R matching the candidate value $R^c$: in case there is no matching, the passport is a forged one and "John Doe" (i.e. the screened individual claiming that his name is John Doe) may be arrested. In case $R^c$ matches some stored reference root digital signature, the passport is considered as genuine and the officer may perform additional security checks:
- the officer retrieves the digital identity photograph 255 stored in the information database 250, by sending a request via the computer 290 containing the serial number 235 printed on $A_1$, receives it back and display the received identity photograph 255 on a screen of the computer 290: the officer can then visually compare the displayed visage (i.e. that of a certain John Doe) with that of the individual being checked and estimate if the two visages are similar or not; and
- the officer retrieves the biometry data 230e on the passport $A_1$ by reading these data on the security marking 210 with the handheld reader 280 connected to the computer 290, and scans the individual's fingerprint by means of a fingerprint scanner 270 connected to the computer 290 and obtains the corresponding individual's biometry data: the officer then checks by means of a program running on the computer 290 if the retrieved biometry data 230e is similar (within a given margin of error) to the obtained individual's biometry data.

If the two visages and the biometry data are judged similar, everything is all right and the checked individual is indeed the real John Doe, the owner of the genuine biometric passport $A_1$.

In case of any one of the above additional security checks fails, clearly, the individual in front of the officer is not the true holder of the genuine biometric passport $A_1$ and has probably stolen the passport of a certain John Doe. Thus, with a secured biometric passport according to the invention a mere offline check can quickly detect any fraud.

In fact, it is even possible to reduce a biometric passport document to a mere piece of paper with just a printed 2D barcode (like the above example of a QR code) including the verification information V=(D,k): with V comprising the holder's biography data and (unique) biometry data, like the holder's fingerprint (within the passport digital data D) and the verification key k. Indeed, according to the invention, even this "reduced" secured passport takes full advantage of the above mentioned forgery-proof link created between the "personal biography data" and the "biometry data" of the passport holder, and the unique and forgery-proof link between the physical person of the holder and the holder's identity.

Figure 3:
FIG. 3 illustrates a batch of components of an aircraft secured according to the invention.

Another illustrative embodiment of the invention relates to components of an aircraft, as shown on FIG. 3. Due to the very high price of certain critical components from which failure could affect the security of the aircraft, like some parts of the reactors (e.g. turbine blades, pumps . . . ) or of the landing gear, or batteries etc. . . . , counterfeiters are interested to produce copies of these components but of course without complying with the required safety technical requirements due to their generally lower quality. Even if an aircraft component is generally marked with a corresponding unique serial number to identify it, that sort of marking may be easily counterfeited. These counterfeit airplane parts are generally defective and can cause severe damages or even plane crashes. This is a growing security problem today. Moreover, even if the components are genuine, they may not be convenient for certain versions of a same type of aircraft, and there is a serious risk that an inappropriate component is inadvertently used for repairing a given aircraft for example. It is thus important to secure at least the critical genuine components that are allowed for given aircraft.

Generally, each component has a corresponding technical data sheet indicating e.g. the component technical name, the component unique serial number, the component manufacturer name, the manufacturing date of the component and certification information. Moreover, for a given aircraft, a corresponding record contains all the technical data sheets of its respective components. However, counterfeited components may have their corresponding fake technical data sheet and thus, it is not obvious (unless by performing technical tests, for example) to detect fraud. For example, how to be sure that a technical data sheet corresponds well to a component mounted on a specific aircraft (and vice versa)?

According to an illustrative embodiment of the invention, the allowed parts to be used for manufacturing or repairing a given aircraft, or that are mounted on the aircraft, are considered as belonging to a batch of "articles" for that very aircraft.

In the specific illustrative embodiment shown on FIG. 3, each article of an aircraft batch, i.e. each allowed aircraft component for mount or repair on a given aircraft, has a corresponding aircraft component identification document AC-ID that contains the same component data as in a conventional technical data sheet (e.g. the aircraft ID code, the aircraft manufacturer name, the component technical name, the component unique serial number, the component manufacturer name, and the manufacturing date of the component) together with additional digital data corresponding, to the aircraft ID code, the aircraft manufacturer name, the assembly date of the component on the aircraft, the name of the technician in charge of performing the conformity check together with the date of the conformity check, and the corresponding (unique) digital signature of the checker. Moreover, each aircraft component identification document AC-ID is secured by means of a machine readable security marking applied on it (preferably tamper-proof). Preferably, each time a component or a set of components are replaced on the aircraft, corresponding secured AC-ID documents are created and a corresponding updated version of the aircraft batch is also created, with the above mentioned corresponding additional digital data (relating to the new mounting operations).

Thus, all the (critical) mounted components on a specific aircraft (here, having the aircraft ID reference HB-SNO), belong to a corresponding batch of mounted components (here, having a total of μ components). A security marking 310 (here in the form of a QR code) is printed on each aircraft component identification document, for example AC-ID:$A_{125}$, that is associated with the corresponding aircraft component, here $A_{125}$, mounted on the aircraft HB-SNO. FIG. 3 particularly shows the component $A_{125}$ of the aircraft batch being a turbine blade adapted to the reactor type mounted on the aircraft HB-SNO and marked with a unique manufacturing serial number (here, 12781, generally engraved by the manufacturer). The component digital data $D_{125}$ (or article digital data) associated with component $A_{125}$ comprises the digital data corresponding to that of the data marking 330 printed on the AC-ID:$A_{125}$: the aircraft ID code 330$a$ (here, HB-SNO), the aircraft manufacturer name 330$b$ (here, AeroABC), the component technical name 330$c$ (here, turbine blade—$1^{st}$ ring), the component serial number 330$d$ (here, 12781), the component manufacturer name 330$e$ (here, PCX), the manufacturing date of the component 330$f$ (here, Nov. 13, 2017), the assembly date of the component on the reactor 330$g$ (here, Feb. 24, 2018), the name of the technician in charge of performing the conformity check 330$h$ (here, the checker is Martin White) together with the date of the conformity check 330$i$ (here, Mar. 20, 2018), and the (unique) digital signature of the checker 330$j$ (here, 2w9s02u).

A component digital signature $x_{125}$ of the component digital data $D_{125}$ of the AC-ID:$A_{125}$ of component $A_{125}$ is calculated by means of a one-way hash function H as $x_{125}=H(D_{125})$. In the same way, all the component digital signatures $x_i$ of the component digital data $D_i$ of component $A_i$ are calculated by means of the one-way hash function H as $x_i=H(D_i)$ (here, i=1, . . . , μ). According to the invention, a tree associated with the batch of components (here, a binary tree) is built having μ leaf nodes a(1,1), . . . , a(1,μ) respectively corresponding to the μ component digital signatures of respective component digital data of the component identification documents of components $A_1$, . . . , $A_μ$. Here, the nodes ordering of the binary tree is the conventional one, i.e. the nodes a(i,j) are arranged according to the values of the indexes (i,j): index i indicates the level in the tree, starting from the leaf nodes level (i=1) to the penultimate nodes level below the root node, and index j running from 1 to μ for the leaf nodes level (level 1), from 1 to μ/2 for the next (non-leaf) nodes level (level 2), etc. and from 1 to 2 for the penultimate nodes level. The tree comprising node levels from the leaf nodes to the root node, every non-leaf node of the tree corresponding to a digital signature by means of the one-way function H of a concatenation of the respective digital signatures of its child nodes according to the tree concatenation ordering.

A reference root digital signature R for the batch of p aircraft components is calculated by means of a one-way function of a (conventional) concatenation of node values of the tree (as explained below). The reference root digital signature R is then stored in a searchable database (preferably a blockchain) accessible to technicians in charge of controlling or changing the mounted components. The tree thus comprises node levels from the leaf nodes to the root node of the tree, every non-leaf node of the tree corresponding to a digital signature by means of the one-way function H of a concatenation of the respective digital signatures of its (two) child nodes according to the tree concatenation ordering (here conventional), the root node corresponding to the reference root digital signature R, i.e. the digital signature by means of the one-way function H of a concatenation of the digital signatures of the nodes of the penultimate nodes level in the tree (according to the nodes ordering in the tree and the tree concatenation ordering).

For a given component $A_i$ of the batch, a verification key $k_i$, corresponding to the component digital signature $x_i$ (i.e. leaf node a(1,i)) of the component digital data $D_i$, is calculated as the sequence of the respective digital signatures, from the leaf nodes level to the penultimate nodes level of the tree, of every other leaf node having the same parent node in the tree that the leaf-node a(1,i) corresponding to the article digital signature $x_i$, and successively at each next level in the tree, of every non-leaf node having the same parent node in the tree that the previous same parent node considered at the preceding level. For each component $A_i$ mounted on the aircraft HB-SNO, the associated component digital data $D_i$ and the corresponding verification key $k_i$ are embedded in the security marking applied on the corresponding aircraft component identification document AC-ID:$A_i$.

For example, in case of a control operation of a component on the aircraft HB-SNO, a technician may send a request to the searchable database containing the component serial number 12781 read on the AC-ID:$A_{125}$ of component $A_{125}$ to be controlled, or its verification key $k_{125}$ as read on the security marking 310 on the corresponding AC-ID:$A_{125}$ document with an appropriate reader, and will receive back the corresponding batch value R. However, in a preferred variant allowing complete offline checking, the technician's reader is connected to a computer having a memory storing all the root digital signatures relating to the aircrafts to be controlled. In this latter variant, the technician can then check if the component is genuine by reading the component digital data $D_{125}$ on the security marking 310, checking that the unique serial number 330$d$ (here, 12781) extracted from $D_{125}$ matches the serial number physically marked on the mounted aircraft component $A_{125}$, calculating the corresponding component digital signature $x_{125}$ (for example, by running a programmed application on a processing unit of the computer which calculates the signature $x_{125}=H(D_{125})$, from the read digital data $D_{125}$), calculating a candidate batch value $R^c$ via the one-way function H programmed on the computer's processing unit as the hash of a concatenation of the leaf node value $a(1,125)=x_{125}$ and the node values given in the corresponding verification key $k_{125}$, and checking that the candidate batch value $R^c$ matches one of the reference root digital signatures stored in the computer's memory (i.e. R, corresponding to the aircraft HB-SNO). In case of full matching (i.e. the serial numbers match and $R^c=R$), the component $A_{125}$ is considered as genuine and belongs to the (up-to-date) aircraft batch of allowed components of the HB-SNO aircraft, if $R^c$ does not match a stored reference root digital signature R, or if the serial numbers do not match, the component $A_{125}$ is possibly counterfeit, or is a genuine component not allowed for the aircraft HB-SNO (e.g. $A_{125}$ does not belong to the right batch for this aircraft), and must be changed.

In a same way, the invention would allow detecting fraud (or errors) from batches of secured AC-IDs of replacement parts stored in a warehouse by verifying the authenticity of the secure markings on the stored parts and checking that the component serial number from the security marking matches that marked on the corresponding component. In case of a highly critical component, a tamperproof material-based security marking may further be applied on the component, while the digital data relating to the corresponding reference unique physical characteristic, i.e. the characteristic digital data CDD (for example, as captured by a suitable sensor when applying the material-based security marking) of this marking is preferably made part of the component digital data D in the security marking of this component, and a corresponding reference unique physical signature data UPS is calculated (for example, by taking a hash of the characteristic digital data CDD, i.e. UPS=H(CDD)) and may also be part of the component digital data. This additional level of security improves the security provided by the unique serial number marked on the component by its manufacturer. Preferably, the reference UPC and UPS are stored in the blockchain (to make them immutable) and are accessible to the technician. Moreover, these reference values may also be further stored in the memory of the technician's computer in order to allow offline authentication of the material-based security marking on the highly critical component.

The further offline operation of authentication of this material-based security marking may comprise measuring the unique physical characteristic on the component, by means of a suitable sensor connected to the computer, and obtaining a candidate characteristic digital data $CDD^c$ from the measured characteristic (for example, via a specific application programmed in the processing unit of his computer). Then, the technician (or the processing unit of his computer, if suitably programmed) compares the obtained $CDD^c$ with the copy of the reference CDD stored in the memory of the computer: in case of "reasonable" matching $CDD^c \approx CDD$ (i.e. within some predefined error tolerance criterion), the material-based security marking, and thus the component, are considered as genuine.

As above mentioned, a copy of the reference characteristic digital data CDD, instead of being stored in the memory of the technician's computer, is part of the article digital data D included in the security marking applied on the component and can be obtained by direct reading on the security marking (with the reader). The technician may then read the candidate $CDD^c$ on the security marking and check that the signature UPS stored in the memory of the computer matches the candidate signature $UPS^c$ calculated from the read candidate $CDD^c$ by computing $UPS^c = H(CDD^c)$: in case of matching $UPS^c = UPS_i$ the material-based security marking, and thus the component, are confirmed as being genuine.

In a variant of the embodiment, the checking of authenticity of a component by a technician may alternatively be performed via online process in a similar way as already explained with the first detailed embodiment of the invention, and will not be repeated here.

According to the invention, it is further possible to verify the conformity of a digital image of a secured document, like an aircraft component identification document AC-ID:$A_{125}$ for example, with respect to the original secured document. Indeed, if a technician in charge of control (or repair) operations has only access to a digital image of the secured document, for example by receiving the image of AC-ID:$A_{125}$ on its reader (which may be, for example, a smartphone suitably programmed), he nevertheless can check that the component data printed on the received image of the document correspond to that of the original document by performing the following operations of:

reading the component digital data $D_{125}$ and the verification key $k_{125}$ on the image of the security marking 310 on the digital image of the document AC-ID:$A_{125}$;

acquiring a reference batch value R of the batch corresponding to the document AC-ID:$A_{125}$; this reference value may be already in the memory of the reader (or the computer connected to the reader) or may be acquired via a communication link from a database storing the reference batch values of aircraft components in case the reader is equipped with a communication unit, by sending a request containing, for example, the component (unique) serial number or merely the key $k_{125}$ read of the image of the security marking 310, and receiving back the corresponding reference batch value R;

calculating (with the programmed one-way function H) a component digital signature $x_{125}$ from the read component digital data $D_{125}$, with $x_{125} = H(D_{125})$;

calculating a candidate batch value $R^c$ (by means of the programmed one-way hash function H) as the digital signature by the hash function H of a concatenation of the leaf node value $x_{125}$ and the node values indicated in the verification key $k_{125}$ (according to the nodes ordering in the tree and the tree concatenation ordering); and verifying that the candidate batch value $R^c$ matches the reference batch value R.

The above mentioned operations of verification of conformity may also be performed on a mere photocopy of an original document AC-ID:$A_{125}$. Indeed, even if an anti-copy feature were on the security marking of the original document that would reveal that the technician has just a photocopy, he nevertheless could read the data on the security marking on the photocopy and perform the above operations of verification of conformity of the data read on the copy with respect to the original data.

Figure 4:
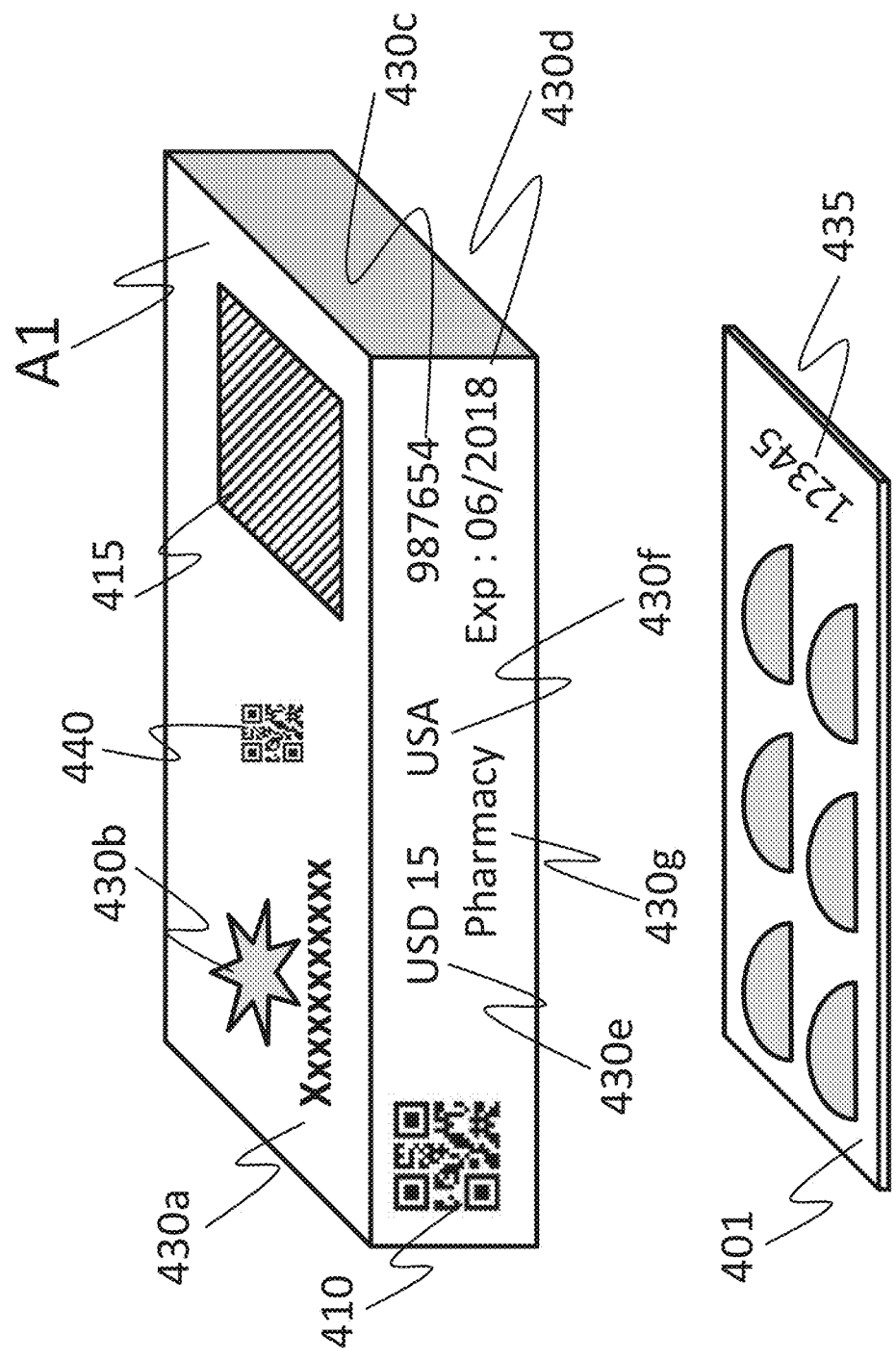
FIG. 4 illustrates a batch of pharma products secured according to the invention.

Another illustrative embodiment of the invention relates to self-secure serialization of pharmaceutical products like medicine packs, as shown on FIG. 4. This embodiment relates to a production batch of medicine packs of a given type of medicament comprising p boxes (or articles) $A_1, \ldots, A_\mu$. In this illustrative example of a typical box $A_1$ shown on FIG. 4, tablets for patients are packaged in a set of serialized blister packs 401 (only one is shown) contained in the box $A_1$. Each blister pack 401 is marked with a unique serial number 435 (here, "12345", applied by the manufacturer), and the box $A_1$ has conventional information printed on it like the name of the medicine 430a, a logo 430b, a box unique serial number (box ID) 430c, an expiry date 430d. In this example, additional conventional data are possibly printed on the box (or, in a variant, on a package leaflet put in the box $A_1$): a recommended retail price 430e, a market country 430f, and a sale restriction indication 430g (e.g. to be sold only in pharmacy). The box $A_1$ is secured by means of a machine readable security marking 410 in the form of a printed 2D barcode (or datamatrix) and further secured with a material-based security marking in the form of a separate tamperproof adhesive anti-copy stamp 415 including randomly dispersed particles which is applied on the box $A_1$. The (random and thus unique) positions of the particles on the stamp in fact are known to constitute a unique physical characteristic of the stamp 415 applied on the box $A_1$, and thus here also a unique physical characteristic of the box $A_1$ itself. The detected positions of the dispersed particles on the stamp 415 are conventionally used to calculate corresponding reference characteristic digital data CDD-$A_1$ of the box $A_1$. Usually, the detection of the dispersed particles, and their positions, is performed via image processing of a digital image of the stamp. Here, the particles can be detected upon illumination of the stamp with a mere white flash (a white LED for example), like the flash of a smartphone for example. Preferably, a specific image processing application can be downloaded on a smartphone to make it capable to image a stamp 415, detect the positions of the dispersed particles and calculate from these positions a corresponding characteristic digital data CDD.

According to the invention, the barcode 410 of a box $A_i$ ($i \in \{1, \ldots, \mu\}$) of the batch contains box digital data $D_i$ corresponding to a digital representation of the above mentioned conventional data 430a-430g of the box $A_i$, the respective serial numbers 435 of the blister packs 401 contained in the box $A_i$, and the reference unique physical characteristic digital data CDD-$A_i$ of the box $A_i$. For each box $A_i$ of the batch, an associated box digital signature $x_i$ of its box digital data $D_i$ is calculated by means of a one-way hash function H as $x_i = H(D_i)$, $i=1, \ldots, \mu$.

A tree associated with the batch of boxes (here, a binary tree) is built having $\mu$ leaf nodes $a(1,1), \ldots, a(1,\mu)$ respectively corresponding to the $\mu$ box digital signatures $x_1, \ldots, x_\mu$ of respective box digital data of the boxes $A_1, \ldots, A_\mu$. Here, the nodes ordering of the binary tree is the conventional one, i.e. the nodes $a(i,j)$ are arranged according to the values of the indexes $(i,j)$: index i indicating the level in the tree, starting from the leaf nodes level ($i=1$) to the penultimate nodes level below the root node, and index j running from 1 to $\mu$ for the leaf nodes level (level 1), from 1 to $\mu/2$ for the next (non-leaf) nodes level (level 2), etc. and finally from 1 to 2 for the penultimate nodes level. The tree comprises node levels from the leaf nodes, $a(1,1), \ldots, a(1,\mu)$, to the root node, every non-leaf node of the tree corresponding to a digital signature by means of the one-way hash function H of a concatenation of the respective digital signatures of its child nodes according to the nodes ordering in the tree and the tree concatenation ordering (the root node corresponding to a reference root digital signature).

A reference root digital signature R for all the boxes of the batch is then calculated by means of a one-way hash function H as the digital signature of a concatenation of the digital signatures of the nodes of the penultimate nodes level in the tree (in accordance with the nodes ordering in the tree and the tree concatenation ordering).

The obtained reference root digital signature R is then either published in a media accessible to a user having to check the validity of a secured medicine pack $A_i$, or stored in a searchable root database accessible to the user, or stored in a blockchain (or in a database secured by a blockchain) accessible to the user. For example, the user may send a request containing the serial number 430c, read on the security marking 410 on said box $A_i$, to the searchable root database or blockchain and receive back the corresponding reference batch value R. A link to access the searchable root database (via the web, for example), or the blockchain, may be included in a box data marking 440 (shown as a QR code on FIG. 4) printed on the box $A_i$. Preferably, the reference root digital signature R is made available to the user locally, so that the user can perform the checking operations on offline mode (i.e. by not having to access distant storage means to obtain R): for example, the user has a reader such as a smartphone capable to read and decode the data in the security marking 410 on box $A_i$ (by means of a programed application operable to run on the smartphone's processing unit) and of which memory stores the reference root digital signature R.

To each box $A_i$ of the batch of $\mu$ medicine packs corresponds a verification key $k_i$, associated with the box digital signature $x_i$, i.e. with node $a(1,i)$, and calculated as the sequence of the respective box digital signatures, from the leaf nodes level to the penultimate nodes level of the tree, of every other leaf node having the same parent node in the tree that the leaf-node $a(1,i)$ corresponding to the article digital signature $x_i$, and successively at each next level in the tree, of every non-leaf node having the same parent node in the tree that the previous same parent node considered at the preceding level.

The box digital data $D_i$ and its corresponding box verification key $k_i$ (together constituting the verification information $V_i$ of box $A_i$) are part of the digital data included in the security marking 410 applied on box $A_i$.

The verification of authenticity of the secured box $A_1$ of FIG. 4, belonging to the batch of boxes having the reference root digital signature R, only necessitates to read and decode the box digital data $D_1$ on the security marking 410 on box $A_1$ (with appropriate reader, for example with the above mentioned smartphone having a further programmed application for calculating a signature with the one-way hash function H and a retrieving a root node value from the verification information $V_1=(D_1,k_1)$), calculating the corresponding box digital signature $x_1$ with the one-way function H as $x_1=H(D_1)$, obtaining the reference root digital signature (batch value) R (in this example, the reference batch value R is stored in the memory of the reader), and checking if the obtained reference root digital signature R matches the candidate root digital signature $R^c$ obtained from the read verification information $(D_1,k_1)$ as the digital signature by the one-way hash function H of a concatenation, according to the nodes ordering in the tree and the tree concatenation ordering, of the leaf node value $x_1$ (of leaf node $a(1,1)$) and the node values indicated in the verification key $k_1$. If $R^c \neq R$, the box $A_1$ is counterfeit. If $R^c=R$, the security marking 410 corresponds to that of a genuine box. In this case, several additional security checks can be performed. For example, with a reader equipped with a display (like the above mentioned smartphone), it is possible to extract from the read box digital data $D_1$ any one of the information 430a-430d, display the extracted information and visually check that it matches the corresponding information printed on the box $A_1$. If displayed information does not correspond to a printed one, the box is counterfeit.

A further authentication check of the box $A_1$ is possible by verifying that the material-based security marking 415 is genuine. It suffices to detect the positions of the dispersed particles by imaging the stamp 415 (for example, with the above mentioned smartphone having image processing capabilities) and calculate from these positions a corresponding candidate characteristic digital data $CDD^c$-$A_1$, and then check that this $CDD^c$-$A_1$ is indeed similar (within a given margin of error) to the reference characteristic digital data CDD-$A_1$ extracted from the box digital data $D_1$: if they agree the stamp 415, and thus the box $A_1$, is genuine, if they do not agree the stamp 415, and thus the box $A_1$ (the stamp being tamperproof), is counterfeit.

Still in case of verified matching of the root digital signatures (i.e. $R^c=R$), and even if the information 430a-430d have been verified and/or the material-based security marking 415 is genuine, it is further possible to check if the blister packs 401 contained in box $A_1$ are the right ones: it suffices to check if the unique serial numbers 435 marked on the blister packs match those indicated by the box digital data $D_1$ as read from the security marking 410. If these data do not match, this a proof of fraud: the blister packs of the genuine box $A_1$ have been replaced with other ones (possibly counterfeited, or of another mark, or corresponding to a different medicine). Moreover, still in case of an authentic box $A_1$ (i.e. with $R^c=R$), even if the blister packs 401 are the right ones, in case any one of the additional information extracted from the box digital data $D_1$: recommended retail price 430e, market country 430f, and sale restriction indication 430g, does not correspond to the experienced sale conditions (for example if the medicine pack $A_1$ is sold in a country different from that indicated by data 430f), the corresponding fraud can be detected. This further constitutes a serious alert that the batch itself, or at least a part of it, has been diverted.

Thus, both full track and trace operations and authentication checks of the secured medicine packs are possible due to the forgery-proof link provided according to the invention by the root digital signature between the box data, the blister packs data of the contained blister packs, the unique characterizing physical properties of the box and its blister packs, and the belonging of the box to a given batch.

According to the above detailed description, the invention is clearly compatible with offline and local checking operations for verifying the authenticity of a secured article or conformity of data on an image (or copy) of a secured article with respect to the data associated with the original secured article. However, the invention is also compatible with online verification process, for example by receiving (via a communication link) a reference batch value form an external source (e.g. server or blockchain), or performing some or all the calculation steps involving the one-way function or the one-way accumulator via external computing means (e.g. operating on a server), or even performing the verification that a candidate root digital signature matches a reference root digital signature (and just receiving the result).

The above disclosed subject matter is to be considered illustrative, and not restrictive, and serves to provide a better understanding of the invention defined by the independent claims.

The invention claimed is:

1. A method of securing a given original article belonging to a batch of a plurality of original articles against forgery or tampering, each original article having its own associated article data and corresponding article digital data, comprising the steps of:
    for each original article of the batch, calculating by means of a one-way function an associated article digital signature of its corresponding article digital data;
    forming a tree based on the plurality of calculated article digital signatures for the original articles of the batch and comprising nodes arranged according to a given nodes ordering in the tree, said tree comprising node levels from leaf nodes, corresponding to the plurality of article digital signatures respectively associated to the plurality of original articles in the batch, to a root node of the tree, every non-leaf node of the tree corresponding to a digital signature by means of the one-way function of a concatenation of the above calculated digital signatures of its child nodes according to a tree concatenation ordering, the root node corresponding to a reference root digital signature, which is a digital signature produced by means of the one-way function of a concatenation of the above calculated digital signatures of the nodes of a penultimate nodes level in the tree according to said tree concatenation ordering;
    associating with the given original article a corresponding verification key being a sequence of the respective digital signatures, from the leaf nodes level to the penultimate nodes level, of every other leaf node having the same parent node in the tree that the leaf-node corresponding to the article digital signature of the given original article, and successively at each next level in the tree, of every non-leaf node having the same parent node in the tree that the previous same parent node considered at the preceding level;
    making available to a user the reference root digital signature of the tree; and
    applying on the given original article a machine readable security marking including a representation of its corresponding article digital data and its corresponding verification key,
    thereby obtaining a marked original article of which article data is secured against forgery or tampering.

2. The method according to claim 1, wherein the reference root digital signature of the root node of the tree is either published in a media accessible to the user, or stored in a searchable root database accessible to the user, or stored in a blockchain, or in a database secured by a blockchain, accessible to the user.

3. The method according to claim 2, wherein the marked original article further comprises root node access data marked thereto and containing information sufficient to allow the user access to the reference root digital signature of the root node of the tree corresponding to the batch of original articles, said information being a link to an access interface operable to receive from the user a root request containing article digital data, or a digital signature of article digital data, obtained from a security marking of a marked original article, and send back a reference root digital signature of corresponding tree, the access interface allowing access to, respectively, one of the following:
    the media wherein the reference root digital signature is published;
    the searchable root database wherein the reference root digital signature is stored; and
    the blockchain, or respectively the database secured by a blockchain, wherein the time-stamped reference root digital signature is stored.

4. The method according to claim 1, wherein
    a virtual article is counted as belonging to the batch of original articles, said virtual article having associated virtual article data and its corresponding virtual article digital data, and an associated virtual article digital signature obtained by means of the one-way function of the virtual article digital data, said virtual article being not produced but only used for generating the associated virtual article digital signature; and
    the reference root digital signature associated with said batch of original articles being calculated from a tree having all the article digital signatures of the original articles of the batch, including the virtual article digital signature, as leaf nodes.

5. The method according to claim 1, wherein
    additional article digital data corresponding to the article digital data associated with the marked original article are stored in a searchable information database accessible to the user via an information database interface operable to receive from the user an information request containing article digital data, or a digital signature of article digital data, obtained from a security marking of a marked original article, and send back corresponding additional article digital data.

6. The method according to claim 5, wherein the additional article digital data corresponding to the article digital data associated with the marked original article are concatenated with said article digital data.

7. The method according to claim 1, wherein the article digital data of the marked original article includes corresponding reference characteristic digital data of a unique physical characteristic of the marked original article, or of an associated object or individual.

8. The method according to claim 7, wherein the unique physical characteristic of the marked original article is that of a material-based security marking applied on the original article, or on the associated object.

9. The method according to claim 1, wherein the article digital data of the respective original articles of the batch are spread between given fields common to all the articles of the batch, and digital data relating to these fields are not included in the article digital data but clustered in a separate fields data block associated with the batch, and wherein:

i) the article digital signature of an original article is calculated with the one-way function of a concatenation of the corresponding article digital data and the digital data of the fields data block; and ii) the reference root digital signature is made available to the user together with the associated fields data block.

10. A method of verifying the authenticity of an article, or the conformity of a copy of such article, with respect to a marked original article belonging to a batch of original articles secured according to the method of claim 1, comprising the steps of, upon viewing a test object being said article or said copy of the article:

acquiring a digital image of a security marking on the test object by means of an imager having an imaging unit, a processing unit with a memory, and an image processing unit;

reading a representation of article digital data and an associated verification key on the acquired digital image of the security marking on the test object, and extracting respectively corresponding test article digital data and test verification key from said read representation;

having stored in the memory a reference root digital signature of a root node of a tree of the batch of original articles, and having programmed in the processing unit the one-way function to calculate a digital signature of digital data and of a concatenation of digital signatures according to the nodes ordering in the tree and the tree concatenation ordering;

verifying whether the extracted test article digital data and associated test verification key indeed correspond to the stored reference root digital signature by performing the steps of:

calculating with the one-way function a test digital signature of the extracted test article digital data, said test digital signature corresponding to a test leaf node in a test tree corresponding to the security marking on the test object;

extracting from the sequence of digital signatures in the test verification key, a digital signature of every other leaf node of the test tree having the same parent node than that of the test leaf node and calculating a digital signature of a concatenation of the test digital signature and the extracted digital signature of said every other leaf node, thus obtaining a digital signature of said same parent node of the test leaf node;

successively at each next level in the test tree and up to the penultimate nodes level, extracting from the sequence of digital signatures in the test verification key, a digital signature of every other non-leaf node of the test tree having the same parent node than that of the previous same parent node considered at the preceding step and calculating a digital signature of a concatenation of the digital signature of said respective every other non-leaf node and the obtained digital signature of said previous same parent node, thus obtaining a digital signature of said same parent node of said previous same parent node;

calculating a digital signature of a concatenation of the obtained digital signatures of the non-leaf nodes corresponding to the penultimate nodes level of the test tree, thus obtaining a candidate root digital signature of the root node of the test tree; and checking whether the obtained candidate root digital signature matches the stored reference root digital signature, whereby, in case said root digital signatures match, the article data on the test object are that of a genuine article.

11. The method according to claim 10, wherein the article digital data of the respective original articles of the batch are spread between given fields common to all the articles of the batch, and digital data relating to these fields are not included in the article digital data but clustered in a separate fields data block associated with the batch, and wherein:

i) the article digital signature of an original article is calculated with the one-way function of a concatenation of the corresponding article digital data and the digital data of the fields data block; and ii) the reference root digital signature is made available to the user together with the associated fields data block, the memory of the processing unit further storing the associated fields data block, and wherein:

the step of calculating a test digital signature corresponding to a test leaf node in a test tree corresponding to the security marking on the test object comprises calculating with the one-way function a digital signature of a concatenation of the extracted test article digital data and the digital data of the stored fields data block.

12. The method according to claim 10, wherein the reference root digital signature of the root node of the tree is either published in a media accessible to the user, or stored in a searchable root database accessible to the user, or stored in a blockchain, or in a database secured by a blockchain, accessible to the user, and the imager is further equipped with a communication unit operable to send and receive back data via a communication link, comprising the preliminary steps of:

sending with the communication unit via the communication link a request to said root database, and receiving back the reference root digital signature; and storing the received root digital signature in the memory of the imager.

13. The method according to claim 10, wherein the reference root digital signature of the root node of the tree is either published in a media accessible to the user, or stored in a searchable root database accessible to the user, or stored in a blockchain, or in a database secured by a blockchain, accessible to the user, and wherein the marked original article further comprises root node access data marked thereto and containing information sufficient to allow the user to access to the reference root digital signature of the root node of the tree corresponding to the batch of original articles, said information being a link to an access interface operable to receive from the user a root request containing article digital data, or a digital signature of article digital data, obtained from a security marking of a marked original article, and send back a reference root digital signature of corresponding tree, the access interface allowing access to, respectively, one of the following:

the media wherein the reference root digital signature is published;

the searchable root database wherein the reference root digital signature is stored; and the blockchain, or respectively the database secured by a blockchain, wherein the time-stamped reference root digital signature is stored, and the imager is further equipped with a communication unit operable to send and receive data via a communication link, comprising the preliminary steps of:

reading the root node access data marked on the test object with the imager;

sending with the communication unit via the communication link a root request to said access interface containing the article digital data, or a digital signature of said article digital data, obtained from the security marking on the test object, and receiving back a corresponding reference root digital signature of associated batch; and storing the received reference root digital signature in the memory of the imager.

14. The method according to claim 10, wherein additional article digital data corresponding to the article digital data associated with the marked original article are stored in a searchable information database accessible to the user via an information database interface operable to receive from the user an information request containing article digital data, or a digital signature of article digital data, obtained from a security marking of a marked original article, and send back corresponding additional article digital data, and the imager is further equipped with communication means operable to send to the information database interface an information request containing article digital data, or corresponding article digital signature data, obtained from the security marking on the test object, and receive back corresponding additional article digital data.

15. The method according to claim 10, wherein the article digital data of the marked original article includes corresponding reference characteristic digital data of a unique physical characteristic of the marked original article, or of an associated object or individual, and the imager is further equipped with a sensor operable to detect a unique physical characteristic of respectively a marked original article, or of an associated object or individual, and the processing unit is programmed to extract corresponding characteristic digital data from a detection signal received from the sensor, the imager having stored in the memory reference characteristic digital data CDD corresponding to said unique physical characteristic of respectively the marked original article, or of the associated object or individual, comprising the further steps of, upon viewing a subject being said article or said associated object or individual:

detecting with the sensor a unique physical characteristic of the subject and extracting corresponding candidate characteristic digital data $CDD^c$;

comparing the obtained candidate characteristic digital data $CDD^c$ with the stored reference characteristic digital data CDD; and in case the candidate characteristic digital data $CDD^c$ is similar to the stored reference characteristic digital data CDD, within a given tolerance criterion, the subject is considered as corresponding respectively to a genuine article, or an object or individual validly associated with a genuine article.

16. A method of verifying the conformity of an article digital image of an article with respect to a marked original article belonging to a batch of original articles secured according to the method of claim 1, comprising the steps of:

obtaining the article digital image showing a security marking on the article by means of an imager having an imaging unit, a processing unit with a memory, and an image processing unit;

reading a representation of article digital data and of an associated verification key on the obtained digital image of the security marking, and extracting respectively corresponding test article digital data and associated test verification key from said read representation;

having stored in the memory a reference root digital signature of a root node of a tree of the batch of original articles, and having programmed in the processing unit the one-way function to calculate a digital signature of digital data and of a concatenation of digital signatures according to the nodes ordering in the tree and the tree concatenation ordering;

verifying whether the extracted test article digital data and test verification key indeed correspond to the stored reference root digital signature by performing the steps of:

calculating with the one-way function a test digital signature of the extracted test article digital data, said test digital signature corresponding to a test leaf node in a test tree corresponding to the security marking on the test object;

extracting from the sequence of digital signatures in the test verification key, a digital signature of every other leaf node of the test tree having the same parent node than that of the test leaf node and calculating a digital signature of a concatenation of the test digital signature and the extracted digital signature of said every other leaf node, thus obtaining a digital signature of said same parent node of the test leaf node;

successively at each next level in the test tree and up to the penultimate nodes level, extracting from the sequence of digital signatures in the test verification key, a digital signature of every other non-leaf node of the test tree having the same parent node than that of the previous same parent node considered at the preceding step and calculating a digital signature of a concatenation of the digital signature of said respective every other non-leaf node and the obtained digital signature of said previous same parent node, thus obtaining a digital signature of said same parent node of said previous same parent node;

calculating a digital signature of a concatenation of the obtained digital signatures of the non-leaf nodes corresponding to the penultimate nodes level of the test tree, thus obtaining a candidate root digital signature of the root node of the test tree; and checking whether the obtained candidate root digital signature matches the stored reference root digital signature, whereby, in case said root digital signatures match, the article digital image is that of a genuine marked original article.

17. The method according to claim 16, wherein the article digital data of the respective original articles of the batch are spread between given fields common to all the articles of the batch, and digital data relating to these fields are not included in the article digital data but clustered in a separate fields data block associated with the batch, and wherein:

i) the article digital signature of an original article is calculated with the one-way function of a concatenation of the corresponding article digital data and the digital data of the fields data block; and ii) the reference root digital signature is made available to the user together with the associated fields data block, the memory of the processing unit further storing the associated fields data block, and wherein:

the step of calculating a test digital signature corresponding to a test leaf node in a test tree corresponding to the security marking on the test object comprises calculating with the one-way function a digital signature of a concatenation of the extracted test article digital data and the digital data of the stored fields data block.

18. The method according to claim 16, wherein the reference root digital signature of the root node of the tree is either published in a media accessible to the user, or stored in a searchable root database accessible to the user, or stored in a blockchain, or in a database secured by a blockchain, accessible to the user, and the imager is further equipped with a communication unit operable to send and receive back data via a communication link, comprising the preliminary steps of:
- sending with the communication unit via the communication link a request to said root database, and receiving back the reference root digital signature; and
- storing the received root digital signature in the memory of the imager.

19. The method according to claim 16, wherein the article digital data of the marked original article includes corresponding reference characteristic digital data of a unique physical characteristic of the marked original article, or of an associated object or individual, and the imager is further equipped with a sensor operable to detect a unique physical characteristic of respectively an object or an individual associated with a marked original article, and the processing unit is programmed to extract corresponding characteristic digital data from a detection signal received from the sensor, the imager having stored in the memory reference characteristic digital data CDD corresponding to said unique physical characteristic of respectively the associated object or individual, comprising the further steps of, upon viewing a subject being said associated object or individual:
- detecting with the sensor a unique physical characteristic of the subject and extracting corresponding candidate characteristic digital data $CDD^c$;
- comparing the obtained candidate characteristic digital data $CDD^c$ with the stored reference characteristic digital data CDD; and
- in case the candidate characteristic digital data $CDD^c$ is similar to the stored reference characteristic digital data CDD, within a given tolerance criterion, the subject is considered as corresponding respectively to an object or individual validly associated with a genuine marked original article.

20. An article belonging to a batch of a plurality of original articles and secured against forgery or tampering according to the method of claim 1, each original article of the batch having its own article digital data and corresponding verification key, said batch having a corresponding reference root digital signature, comprising:
- a machine readable security marking applied on the article and including a representation of its article digital data and its verification key.

21. The article according to claim 20, wherein the article digital data of the article include reference characteristic digital data CDD of a corresponding unique physical characteristic of the article, or of an associated object or individual.

22. The article according to claim 21, wherein the unique physical characteristic of the article is that of a material-based security marking applied on the article.

23. A system for verifying the authenticity of an article, or the conformity of a copy of such article, with respect to a marked original article belonging to a batch of original articles secured according to the method of claim 1, comprising an imager having an imaging unit, a processing unit with a memory, and an image processing unit, the memory storing a reference root digital signature of a tree corresponding to the batch of original articles, and the one-way function to calculate a digital signature of digital data and of a concatenation of digital signatures according to the nodes ordering in the tree and the tree concatenation ordering being programmed in the processing unit, said system being operable to:
- acquire with the imager a digital image of a security marking on a test object being said article or said copy of the article;
- read with the imager a representation of article digital data and of an associated verification key on the acquired digital image of the security marking on the test object, and extract respectively corresponding test article digital data and test verification key from said read representation;
- verify whether the extracted test article digital data and associated verification key indeed correspond to the stored reference root digital signature by executing on the processing unit the further programmed steps of:
  - calculating with the one-way function a test digital signature from the calculated digital signature of the extracted test article digital data, said test digital signature corresponding to a test leaf node in a test tree corresponding to the security marking on the test object;
  - extracting from the sequence of digital signatures in the test verification key, a digital signature of every other leaf node of the test tree having the same parent node than that of the test leaf node and calculating a digital signature of a concatenation of the test digital signature and the extracted digital signature of said every other leaf node, thus obtaining a digital signature of said same parent node of the test leaf node;
  - successively at each next level in the test tree and up to the penultimate nodes level, extracting from the sequence of digital signatures in the test verification key, a digital signature of every other non-leaf node of the test tree having the same parent node than that of the previous same parent node considered at the preceding step and calculating a digital signature of a concatenation of the digital signature of said respective every other non-leaf node and the obtained digital signature of said previous same parent node, thus obtaining a digital signature of said same parent node of said previous same parent node;
  - calculating a digital signature of a concatenation of the obtained digital signatures of the non-leaf nodes corresponding to the penultimate nodes level of the test tree, thus obtaining a candidate root digital signature of the root node of the test tree; and
  - checking whether the obtained candidate root digital signature matches the stored reference root digital signature,
- whereby, in case said root digital signatures match, the system is configured to deliver an indication that the article data on the test object are that of a genuine article.

24. The system according to claim 23, wherein the article digital data of the respective original articles of the batch are spread between given fields common to all the articles of the batch, and digital data relating to these fields are not included in the article digital data but clustered in a separate fields data block associated with the batch, and wherein:
  i) the article digital signature of an original article is calculated with the one-way function of a concatenation of the corresponding article digital data and the digital data of the fields data block; and ii) the reference root digital signature is made available to the user together with the associated fields data block, the memory of the processing unit further storing the associated fields data block, and wherein:

the step of calculating a test digital signature corresponding to a test leaf node in a test tree corresponding to the security marking on the test object comprises calculating with the one-way function a digital signature of a concatenation of the extracted test article digital data and the digital data of the stored fields data block.

25. A system for verifying the conformity of an article digital image of an article with respect to a marked original article belonging to a batch of original articles secured according to the method of claim 1, comprising an imager having an imaging unit, a processing unit with a memory, and an image processing unit, the memory storing a reference root digital signature of a tree corresponding to the batch of original articles, and the one-way function to calculate a digital signature of digital data and of a concatenation of digital signatures according to the nodes ordering in the tree and the tree concatenation ordering being programmed in the processing unit, said system being operable to:

obtain the article digital image showing a security marking on the article by means of the imager;

read with the imager a representation of article digital data and of an associated verification key on the obtained digital image of the security marking, and extract respectively corresponding test article digital data and associated test verification key from said read representation;

verify whether the extracted test article digital data and test verification key indeed correspond to the stored reference root digital signature by executing on the processing unit the further programmed steps of:

calculating with the one-way function a test digital signature of the extracted test article digital data, said test digital signature corresponding to a test leaf node in a test tree corresponding to the security marking on the test object;

extracting from the sequence of digital signatures in the test verification key, a digital signature of every other leaf node of the test tree having the same parent node than that of the test leaf node and calculating a digital signature of a concatenation of the test digital signature and the extracted digital signature of said every other leaf node, thus obtaining a digital signature of said same parent node of the test leaf node;

successively at each next level in the test tree and up to the penultimate nodes level, extracting from the sequence of digital signatures in the test verification key, a digital signature of every other non-leaf node of the test tree having the same parent node than that of the previous same parent node considered at the preceding step and calculating a digital signature of a concatenation of the digital signature of said respective every other non-leaf node and the obtained digital signature of said previous same parent node, thus obtaining a digital signature of said same parent node of said previous same parent node;

calculating a digital signature of a concatenation of the obtained digital signatures of the non-leaf nodes corresponding to the penultimate nodes level of the test tree, thus obtaining a candidate root digital signature of the root node of the test tree; and checking whether the obtained candidate root digital signature matches the stored reference root digital signature, whereby, in case said root digital signatures match, the system is configured to deliver an indication that the article digital image is that of a genuine marked original article.

26. The system according to claim 25, wherein the article digital data of the respective original articles of the batch are spread between given fields common to all the articles of the batch, and digital data relating to these fields are not included in the article digital data but clustered in a separate fields data block associated with the batch, and wherein:

i) the article digital signature of an original article is calculated with the one-way function of a concatenation of the corresponding article digital data and the digital data of the fields data block; and ii) the reference root digital signature is made available to the user together with the associated fields data block, the memory of the processing unit further storing the associated fields data block, and wherein:

the step of calculating a test digital signature corresponding to a test leaf node in a test tree corresponding to the security marking on the test object comprises calculating with the one-way function a digital signature of a concatenation of the extracted test article digital data and the digital data of the stored fields data block.

* * * * *